US012442186B2

(12) United States Patent
Headley et al.

(10) Patent No.: US 12,442,186 B2
(45) Date of Patent: Oct. 14, 2025

(54) CEILING SYSTEM AND CEILING BAFFLE THEREOF

(71) Applicant: TURF DESIGN, INC., Gilberts, IL (US)

(72) Inventors: Dustin Headley, Hoffman Estates, IL (US); Jason Gillette, Chicago, IL (US)

(73) Assignee: Turf Design, Inc., Gilberts, IL (US)

(*) Notice: Subject to any disclaimer, the term of this patent is extended or adjusted under 35 U.S.C. 154(b) by 0 days.

(21) Appl. No.: 18/428,730

(22) Filed: Jan. 31, 2024

(65) Prior Publication Data

US 2024/0167274 A1 May 23, 2024

Related U.S. Application Data

(63) Continuation of application No. 17/902,479, filed on Sep. 2, 2022, now Pat. No. 11,913,225, which is a (Continued)

(51) Int. Cl.

*E04B 9/00* (2006.01)
*E04B 1/82* (2006.01)

(Continued)

(52) U.S. Cl.

CPC ................ *E04B 9/001* (2013.01); *E04B 1/84* (2013.01); *E04B 9/0414* (2013.01); *E04B 9/045* (2013.01);

(Continued)

(58) Field of Classification Search

CPC .......... E04B 1/84; E04B 9/001; E04B 9/0414; E04B 9/045; E04B 9/064; E04B 9/225; G10K 11/168

See application file for complete search history.

(56) References Cited

U.S. PATENT DOCUMENTS

| | | | |
|---|---|---|---|
| 1,942,662 A | 1/1934 | Rosenblatt | |
| 2,753,440 A | 7/1956 | Wakefield | |

(Continued)

FOREIGN PATENT DOCUMENTS

| | | | |
|---|---|---|---|
| EP | 0002432 A1 * | 6/1979 | E04B 9/12 |
| EP | 0606146 | 7/1994 | |
| ES | 1155533 U * | 4/2016 | E04B 9/366 |

OTHER PUBLICATIONS

English translation of ES 1155533 U, accessed Feb. 3, 2025 via Espacenet.com (Year: 2016).*

(Continued)

*Primary Examiner* — Jeremy A Luks
(74) *Attorney, Agent, or Firm* — Patrick Sheldrake

(57) ABSTRACT

A ceiling system and a ceiling baffle thereof. The ceiling baffle may include a body portion and at least one locking mechanism. The body portion may have a top edge having a recess that is defined by a floor, a first wall extending from the floor to the top edge, and a second wall extending from the floor to the top edge. The at least one locking mechanism may protrude from the floor of the recess along a longitudinal axis and be spaced apart from the first wall by a first gap and from the second wall by a second gap. The at least one locking mechanism may have a first engagement surface that faces the floor of the recess on a first side of the longitudinal axis and a second engagement surface that faces the floor of the recess on a second side of the longitudinal axis.

19 Claims, 28 Drawing Sheets

Related U.S. Application Data continuation of application No. 16/669,910, filed on Oct. 31, 2019, now Pat. No. 11,434,636, which is a continuation of application No. 15/639,638, filed on Jun. 30, 2017, now Pat. No. 10,508,444.

(60) Provisional application No. 62/518,347, filed on Jun. 12, 2017, provisional application No. 62/517,640, filed on Jun. 9, 2017, provisional application No. 62/357,026, filed on Jun. 30, 2016, provisional application No. 62/357,066, filed on Jun. 30, 2016.

(51) Int. Cl.

| | |
|---|---|
| ***E04B 1/84*** | (2006.01) |
| ***E04B 9/04*** | (2006.01) |
| ***E04B 9/06*** | (2006.01) |
| ***E04B 9/36*** | (2006.01) |
| ***G10K 11/162*** | (2006.01) |
| ***G10K 11/168*** | (2006.01) |

(52) U.S. Cl.

CPC .......... *G10K 11/162* (2013.01); *G10K 11/168* (2013.01); *E04B 2001/829* (2013.01); *E04B 9/064* (2013.01); *E04B 9/366* (2013.01)

(56) References Cited

U.S. PATENT DOCUMENTS

| | | | |
|---|---|---|---|
| 3,312,304 | A | 4/1967 | Chen |
| 3,378,974 | A | 4/1968 | Bush |
| 3,473,280 | A | 10/1969 | Stahlhut |
| 3,522,923 | A | 8/1970 | Charpentier |
| 3,578,105 | A | 5/1971 | Griff |
| 3,765,141 | A | 10/1973 | Shayman |
| 3,969,870 | A | 7/1976 | Deaton |
| 3,996,458 | A | 12/1976 | Jones et al. |
| 4,197,923 | A | 4/1980 | Harris |
| 4,200,171 | A | 4/1980 | Seymour et al. |
| 4,228,867 | A | 10/1980 | Wirt |
| 4,365,449 | A | 12/1982 | Liautaud |
| 4,665,674 | A | 5/1987 | Brugman |
| 4,680,910 | A | 7/1987 | Perk |
| 5,128,850 | A | 7/1992 | Juodvalkis |
| 5,292,282 | A | 3/1994 | Callas |
| 5,475,962 | A | 12/1995 | Horsten |
| 5,832,685 | A | 11/1998 | Hermanson |
| 6,205,732 | B1 | 3/2001 | Rebman |
| 6,209,680 | B1 | 4/2001 | Perdue |
| 6,374,564 | B1 | 4/2002 | Fletterick |
| 6,892,500 | B2 | 5/2005 | Zaborowski |
| D658,786 | S | 5/2012 | Koennecke |
| 8,733,053 | B2 | 5/2014 | Kabatsi et al. |
| 8,745,946 | B2 | 6/2014 | D'Alessandro |
| 8,782,987 | B2 | 7/2014 | Kabatsi et al. |
| 9,038,344 | B2 | 5/2015 | Mayer |
| 9,163,402 | B2 | 10/2015 | Kabatsi et al. |
| 9,175,473 | B2 | 11/2015 | Kaump |
| RE45,851 | E | 1/2016 | Bodine |
| 9,279,253 | B1 | 3/2016 | Gaydos |
| 9,353,521 | B2 | 5/2016 | Waters |
| 9,410,317 | B1 | 8/2016 | Kilian et al. |
| D767,171 | S | 9/2016 | Kilian et al. |
| D767,816 | S | 9/2016 | Kilian et al. |
| D771,279 | S | 11/2016 | Kilian et al. |
| D771,280 | S | 11/2016 | Kilian et al. |
| D771,281 | S | 11/2016 | Kilian et al. |
| 9,506,249 | B2 | 11/2016 | Kabatsi et al. |
| D777,349 | S | 1/2017 | Kilian et al. |
| D777,943 | S | 1/2017 | Kilian et al. |
| D777,944 | S | 1/2017 | Kilian et al. |
| D777,945 | S | 1/2017 | Kilian et al. |
| D777,946 | S | 1/2017 | Kilian et al. |
| D777,951 | S | 1/2017 | Kilian et al. |
| D781,464 | S | 3/2017 | Kilian et al. |
| D783,182 | S | 4/2017 | Kilian et al. |
| D783,183 | S | 4/2017 | Kilian et al. |
| D783,184 | S | 4/2017 | Kilian et al. |
| D784,562 | S | 4/2017 | Kilian et al. |
| D784,563 | S | 4/2017 | Kilian et al. |
| D784,564 | S | 4/2017 | Kilian et al. |
| D784,565 | S | 4/2017 | Kilian et al. |
| D785,212 | S | 4/2017 | Kilian et al. |
| 9,663,949 | B1 | 5/2017 | Caste |
| D791,979 | S | 7/2017 | Kilian et al. |
| D791,980 | S | 7/2017 | Kilian et al. |
| D791,981 | S | 7/2017 | Kilian et al. |
| D792,986 | S | 7/2017 | Kilian et al. |
| D794,222 | S | 8/2017 | Kilian et al. |
| D794,223 | S | 8/2017 | Kilian et al. |
| D794,224 | S | 8/2017 | Kilian et al. |
| D794,836 | S | 8/2017 | Kilian et al. |
| D795,466 | S | 8/2017 | Kilian et al. |
| 9,739,057 | B2 | 8/2017 | Bergman |
| 9,765,519 | B2 | 9/2017 | Bergman |
| D802,173 | S | 11/2017 | Kilian et al. |
| D802,174 | S | 11/2017 | Kilian et al. |
| D821,613 | S | 6/2018 | Kilian et al. |
| 10,094,108 | B2 | 10/2018 | Murao |
| D840,551 | S | 2/2019 | Kilian et al. |
| D846,160 | S | 4/2019 | Kilian et al. |
| 10,508,444 | B2 | 12/2019 | Gillette |
| 11,434,636 | B2 | 9/2022 | Gillette |
| 2003/0019179 | A1 | 1/2003 | Colson |
| 2003/0205016 | A1 | 11/2003 | Gulbrandsen |
| 2005/0011150 | A1 | 1/2005 | Stackenwalt et al. |
| 2006/0248826 | A1 | 11/2006 | Owens |
| 2007/0193131 | A1* | 8/2007 | Ortiz .................... E04B 9/0478 52/144 |
| 2011/0078970 | A1 | 4/2011 | Boyd |
| 2012/0317915 | A1 | 12/2012 | Koennecke |
| 2015/0068135 | A1 | 3/2015 | Waters |
| 2015/0167297 | A1 | 6/2015 | St-Laurent |
| 2016/0281353 | A1 | 9/2016 | Gillette |
| 2017/0073968 | A1 | 3/2017 | Kilian |
| 2018/0245344 | A1 | 8/2018 | Venjen-Jensen |
| 2018/0363295 | A1 | 12/2018 | Gillette |

OTHER PUBLICATIONS

Pinta Acoustic Inc., pinta acoustic introduces SONEX® PLANO Absorbers Customizable to add a distinctive flair with high sound absorption, pp. 1-4, Oct. 27, 2015, Pinta Acoustic Inc., https://www.pinta-acoustic.com/blog/2015/10/27/sonex-plano-absorbers/.

Echojazz AG, EchoBaffle, single Facebook® post, single album, and two images from album, Jun. 26, 2015, Facebook®, https://www.facebook.com/echojazz.acoustic/.

Echojazz AG, EchoPanel® Fold-It Maxi by Gavin Harris, single Facebook® post, single album, and three images from album, Jun. 26, 2015, Facebook®, https://www.facebook.com/echojazz.acoustic/.

(Author Uknown), Marketing Bulletin Tectum Sound Baffle Application, Mar. 2006, pp. 1-2, https://www.buildsite.com/pdf/tectum/Hanging-Baffles-Installation-Instructions-B4616.pdf.

* cited by examiner

Acoustic Testing (ASTM C 423)

| FREQUENCY (Hz) | SOUND ABSORPTION COEFFICIENT |
|---|---|
| 32 | .03 |
| 40 | .01 |
| 50 | -.02 |
| 63 | -.07 |
| 80 | .06 |
| 100 | .09 |
| 125 | .12 |
| 160 | .20 |
| 200 | .24 |
| 250 | .33 |
| 315 | .45 |
| 400 | .59 |
| 500 | .76 |
| 630 | .85 |
| 800 | .89 |
| 1,000 | 1.00 |
| 1,250 | 1.06 |
| 1,600 | 1.06 |
| 2,000 | .99 |
| 2,500 | .89 |
| 3,150 | .83 |
| 4,000 | .94 |
| 5,000 | 1.04 |
| 6,300 | 1.00 |
| 8,000 | 1.05 |
| 10,000 | 1.07 |
| 12,500 | 1.07 |

72 72 74 76

Fig. 17

CEILING SYSTEM AND CEILING BAFFLE THEREOF

CROSS-REFERENCE TO RELATED APPLICATIONS

The present application is a continuation of U.S. patent application Ser. No. 17/902,479, filed Sep. 2, 2022, which is a continuation of U.S. patent application Ser. No. 16/669,910, filed Oct. 31, 2019, now U.S. Pat. No. 11,434,636, which is a continuation of U.S. patent application Ser. No. 15/639,638, filed Jun. 30, 2017, now U.S. Pat. No. 10,508,444, which claims priority to: (1) U.S. Provisional Patent Application Ser. No. 62/357,026, filed Jun. 30, 2016; (2) U.S. Provisional Patent Application Ser. No. 62/357,066, filed Jun. 30, 2016; (3) U.S. Provisional Patent Application Ser. No. 62/517,640, filed Jun. 9.2017; and (4) U.S. Provisional Patent Application Ser. No. 62/518,347, filed Jun. 12, 2017, all of which are hereby incorporated by reference in their entirety.

BACKGROUND a. Technical Field

The instant disclosure relates to ceiling baffles, ceiling baffle systems for a dynamic acoustic ceiling, along with the methods for installing the ceiling baffles. In particular, the instant disclosure relates to dynamic acoustic ceiling systems, that include multiple differently shaped baffles that can be quickly and easily installed into construction ceiling hangers to provide an aesthetically pleasing image, such as an undulating image, along with a reduction in unwanted noise and/or room acoustics.

The instant disclosure further relates to an apparatus that is configured using recycled polyester felt or PET Felt, and in the preferred embodiment, provides for six different shapes that when installed in a repeating pattern (forwards and backwards for 11 baffles; 1-2-3-4-5-6-5-4-3-2-1) creates an undulating effect or image. Each baffle of the preferred embodiment is configured from a three-piece PET Felt laminate for strength and contains one or more locking configurations, made of the same PET Felt material, thereby allowing the baffle to be locked into the hanger without any extra tools.

b. Background of Disclosure

In general terms, ceilings can be of two different types, suspended or exposed. Suspended ceilings are usually hung at a distance below the structural members to hide mechanical and electrical equipment, along with electrical conduit, HVAC ducts, water pipes, sewage lines, lighting fixtures, and similar structures. In order to construct a suspended ceiling, a metal grid is suspended from the actual ceiling, usually by wires, and acoustical or similar tiles, are inserted and supported by the grid.

However, either for cost or design purposes, many designs provide that the mechanical and electrical equipment are to be seen and not hidden. In these designs, there is no dropped ceiling and the ceiling is left to be viewed from the floor. Although the exposed ceiling may be a function of the design appeal, quite often an exposed ceiling creates acoustic problems, especially in large industrial rooms. Sound from one area of the room, can be reflected off the ceiling and be heard in other areas of the room. If there are a lot of workers or machinery, the room can become quite loud.

In order to minimize excessive and/or unwanted sound generated because of the exposed ceiling, one solution is to hang baffles from the ceiling at certain intervals to allow for the exposed ceiling to be viewed, but to reduce the acoustic profile. As an example of a structure intended to reduce unwanted noise is the Supported Architectural Structure disclosed and claimed in U.S. Pat. No. 8,782,987, to Kabatsi et al., which discloses a plurality of primary supports configured to couple with one or more architectural structures, and a plurality of flexible fins is incorporated into the structure using primary supports, secondary supports and attachment points.

Another example of a ceiling structure is U.S. patent application Ser. No. 10/774,233, to Stackenwalt et al., which discloses a decorative structure, which may be curved, suspended within a space and which includes a panel fastened to a support structure by a clip, a portion of which extends along a face of the panel.

These examples utilize additional supports, attachment hardware and clips to assist in suspending the flexible fins or decorative panels to the ceiling or to ceiling structure. In doing so, each of these examples necessitate tools to assemble the structure and to suspend the structure to the ceiling or ceiling support structure.

As such there is a need for a dynamic acoustic ceiling system that includes multiple shaped baffles that can be quickly and easily installed onto existing construction ceiling hangers or support structures without the need for tools, separate attachment devices, clips or the like. There is also a need for a dynamic acoustic ceiling system that is an aesthetically pleasing image, such as an undulating image, along with the function of reducing unwanted noise.

The foregoing is intended only to illustrate the present technical field and background art and should not be taken as a limitation or disavowal of claim scope.

BRIEF SUMMARY

The present disclosure is an improved acoustic ceiling baffle, and an improved dynamic acoustic ceiling system, along with improved methods for installing the ceiling baffles and creating the dynamic acoustic ceiling system. In the preferred embodiment, the improvement comprises ceiling baffles that are configured with a locking mechanism to be quickly and easily installed into ceiling hangers or ceiling structures, such as a standard UNISTRUT® metal framing system, to provide an aesthetically pleasing image, such as an undulating image, along with functioning to reduce unwanted noise or room acoustics. Alternative embodiments include numerous baffle designs and additional installation mechanisms.

The present disclosure comprise baffles that are manufactured from recyclable and/or recycled materials, such as recycled polyester felt or PET Felt, and in the preferred embodiment, provides that each baffle is configured from a laminate of three pieces of the PET Felt for strength. In the preferred embodiment, the middle piece of the three extends beyond the other two pieces, but the other two pieces are laminated together (with the middle piece) to create a wider dimension at one end of the baffle. Further, the wider end of the baffle comprises one or more locking mechanisms or configurations made of the same PET Felt material (in the preferred embodiment), by cutting away the unwanted material and leaving the locking mechanism. This locking configuration allows for the baffle to be locked into the ceiling hanger without the need for tools, clips or any additional attachment devices, besides the locking mechanism.

The present disclosure further relates to an improved dynamic acoustic ceiling system comprising a number of differently shaped ceiling baffles that can be installed into a ceiling structure such that the system, as a whole, provides an aesthetically pleasing image, such as an undulating image in the preferred embodiment, based on the placement of the differently shaped ceiling baffles. As a non-limiting example, six differently shaped baffles can be installed in a repeating pattern one through six, and then in the opposite pattern, six to one, to create an undulating effect or image. Other baffle systems can be generated using different shaped baffles or similarly shaped baffles as disclosed herein.

The present disclosure also relates to an improved method of installing the ceiling baffles and creating the dynamic acoustic ceiling system, in which the acoustic ceiling baffles are installed into the ceiling structure by pushing the locking mechanism into the existing ceiling hanger, such as the standard UNISTRUT® metal framing system, without the need for additional tools, clips or additional attachment devices, to provide an aesthetically pleasing image, and to function to reduce unwanted noise or room acoustics.

An alternative embodiment for locking the ceiling baffles in place includes the use of magnets embedded in the ceiling baffles allowing the ceiling baffles to be snapped into place on the existing metal ceiling or hangers. Another alternative embodiment for locking the ceiling baffles in place includes a cable suspension system in which cables, such as aircraft cables can be inserted into cable grippers embedded in the ceiling baffles, thereby holding the ceiling baftlers in place on the existing ceiling. Yet another alternative embodiment for locking the ceiling baffles in place includes the use of male and female panel clips with, for example, the male panel clips embedded in the ceiling baffles that connect to and are secured by corresponding female panel clips mounted on the ceiling or ceiling hangers.

It is thus an objective of the present disclosure to provide an improved acoustic ceiling baffle, comprising a locking mechanism made of the same material as the baffle and which allows for the baffle to be installed into an existing ceiling hanger without the need for tools, clips or additional attachment devices.

It is yet another object of the present disclosure to provide an improved dynamic acoustic ceiling system in which the improved ceiling baffles are installed in a manner and pattern that creates an aesthetically pleasing image and functions to reduce unwanted noise or room acoustics.

It is yet another objective of the present disclosure to provide an improved method for installing the improved ceiling baffles and thereby creating the dynamic acoustic ceiling system with an aesthetically pleasing image and which functions to reduce unwanted noise or room acoustics.

Additional objectives and advantages of the present disclosure will become apparent to one having ordinary skill in the art after reading the specification in light of the drawing figures, however, the spirit and scope of the present invention should not be limited to the description of the embodiments contained herein.

BRIEF DESCRIPTION OF THE DRAWINGS

FIG. 17 is a chart of acoustic testing in accordance with ASTM C423 of the ceiling baffles in accordance with the present disclosure.

DETAILED DESCRIPTION

As stated herein, the objective of the present disclosure is to provide an improved acoustic ceiling baffle 10, and an improved dynamic acoustic ceiling system 100, along with improved methods for facilitating the installation of the ceiling baffles 10 and creating the dynamic acoustic ceiling system 100.

Figure 1:
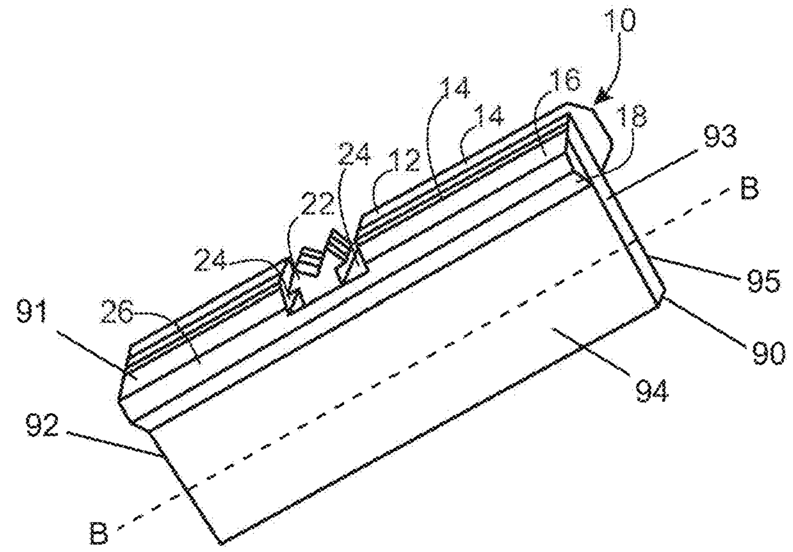
FIG. 1 is a perspective view of a portion of a ceiling baffle in accordance with the present disclosure.
Figure 2:
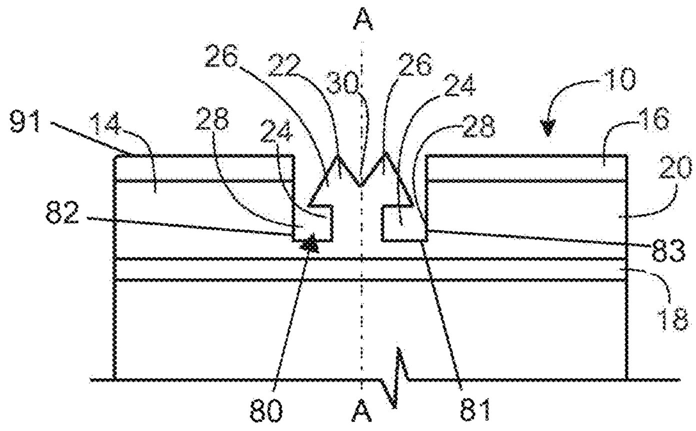
FIG. 2 is a front view of locking mechanism of a ceiling baffle in accordance with the present disclosure.
Figure 3:
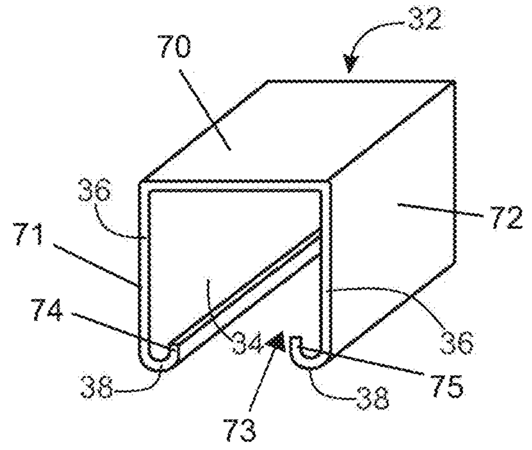
FIG. 3 is a perspective view of a prior art standard ceiling hanger in accordance with the present disclosure.

Referring to the drawings, wherein like reference numerals refer to the same or similar features in the various views, and FIGS. 1, 2 and 4 through 10 show different views of the preferred embodiment of the improved ceiling baffle 10. In particular, FIG. 1 shows an improved ceiling baffle 10, which comprises three pieces of material 12, 14, laminated together. Each of the pieces are made of polyester felt or PET Felt (although other material may be used), with a middle portion 12 being 48 inches long, between 7 inches and 9.5 inches high (with varying heights throughout the length, depending on the particular baffle design) and 9 mm thick. FIGS. 11 through 16 and 26 through 33 show alternative embodiment ceiling baffles, although other shapes and sizes of ceiling baffles will also fall within the scope of the present disclosure. The ceiling baffle 10 may have a bottom edge or end 90, a top edge or end 91, a first side end 92 extending from the bottom end 90 to the top end 91, and a second side end 93 extending from the bottom end 90 to the top end 91. The ceiling baffle 10 may further comprise a baffle axis B-B extending from the first side end 92 to the second side end 93. The ceiling baffle 10 may also have a first major surface 94 and a second major surface 95.

In the preferred embodiment, the outside two portions 14 are also 9 mm thick and 48 inches long, but only 2.25 inches high at the highest end, with each outside portion 14 being tapered at both the upper end 16 and the lower end 18 of each portion 14. As such, the laminated baffle 10 is 27 mm thick at its thickest point 20, based on the middle portion 12 and the two outside portions 14 at the non-tapered ends 20.

Although the preferred embodiment utilizes PET Felt in a three-piece laminated configuration, other materials, such as rubber, plastic, metal or wood, could be used to manufacture the novel baffle 10, and the baffle 10 could be made from a unitary piece, or from any number of pieces or portions laminated together. For example, the ceiling baffle 10 could be made fmm two identical halves (not shown), that when laminated together, will generate the same or similar design as that described and shown in FIGS. 1 and 2. Additionally, the ceiling baffle 10 or portions of the ceiling baffle 10 could be made from material with a memory, as understood by those having ordinary skill in the art, such that whenever the material is forced from its original configuration, it will return to that configuration when there is nothing keeping it from doing so.

In the preferred embodiment, the ceiling baffle 10 has two locations in which a locking mechanism 22 is employed. The locking mechanism 22 is created by cutting away or cutting out portions 24 of the laminated baffle 10 (see also FIGS. 5 through 10 for exemplary locations of the locking mechanism 22 on the ceiling baffle 10). Stated another way, a recess 80 may be formed in the top end 91. The recess 80 may be defined by a floor 81, a first wall 82 extending from the floor 81 to the top end 91, and a second wall 83 extending from the floor 81 to the top end 91. The locking mechanism 22 may extend or protrude from the floor 81 of the recess 80 along a longitudinal axis A-A. The locking mechanism 22 design is a double arrow 26, with recesses 28 below the double arrow 26 and an arrow recess 30 between the double arrows 26. The locking mechanism 22 is particularly designed or configured to mate with a ceiling hanger 32, as described herein. However, other locking mechanisms 22 can be designed and configured (using the ceiling baffle material or another material) to mate with the same ceiling hanger 32 described herein, or to mate with other ceiling hangers 32, without departing from the spirit and scope of the invention.

The locking mechanism 22 is created by cutting away the PET Felt to leave the double arrow shape 26 with the cutaway portion 30 between the double arrows 26 to allow for ease of insertion into the ceiling hanger in accordance with the present disclosure. Due to the location of the locking mechanism 22 on the laminated ceiling baffle 10, the locking mechanism 22 is also 27 mm thick, and the locking mechanism 22 is sized to fit into the recessed portion 34 of a standard ceiling hanger 32, such as a standard UNISTRUT® metal framing system, without the need for additional tools, clips or additional attachment devices.

The ceiling hanger 32 may have a top wall 70, a first sidewall 71, and a second sidewall 72 that collectively define a cavity 73. The ceiling hanger 32 may have a first engagement feature 74 extending from the first sidewall 71 into the cavity 73 and a second engagement feature 75 extending from the second sidewall 72 into the cavity 73. In an embodiment, the ceiling hanger 32 may have J-shaped ends 38 which form the first and second engagement features 74, 75. To install the ceiling baffle 10 into the UNISTRUT ceiling hanger 32, the ceiling baffle 10 is located such that the double arrows 26 can be slid into the recessed portion 34 of the ceiling hanger 32 to be held in place by the sides 36 of the ceiling hanger 32 and the J-shaped ends 38 on the sides 36. Additionally, the ceiling baffle 10 can be placed in the proper location and pushed or snapped into place such that the double arrows 26 compress towards the arrow recess 30 and/or toward the recesses 28 below the double arrows 26 to fit past the J-shaped ends 38 on the sides 36 of the ceiling hanger 32. Once past the J-shaped ends 38, the double arrows 26 spring back or expand back to their normal position inside ceiling hanger 32.

Different sized and shaped locking mechanisms 22 can be utilized depending on need, and based on the ceiling hangers 32 or on any other device for which the ceiling baffle 10 attaches. Further, the preferred embodiment shows two locking mechanisms 22 per ceiling baffle 10, however, each ceiling baffle 10 can be configured with more or less locking mechanisms 22 depending on the length or need of the ceiling baffle. Accordingly, larger ceiling baffles 10 may need additional locking mechanisms 22, while smaller ceiling baffles 10 may only need one locking mechanism 22.

Figure 4A:
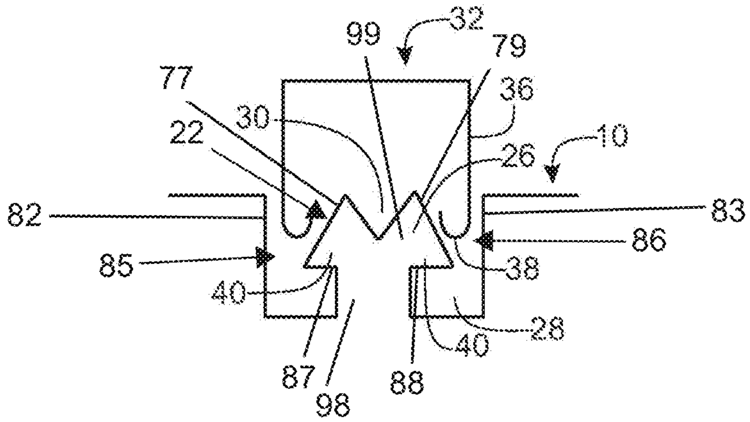
FIGS. 4A through 4C are front views of a portion of a ceiling baffle being snapped into a standard ceiling hanger in accordance with the present disclosure.
Figure 4B:
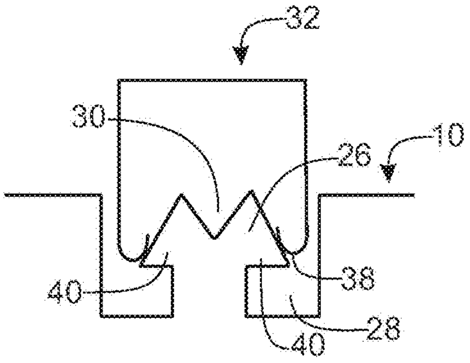
Figure 4C:
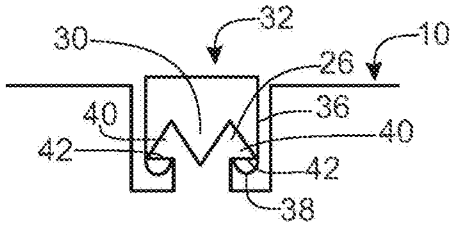

FIGS. 4A to 4C shows the double arrow 26 portion of the ceiling baffle 10 as it is pushed or snapped into place. In FIG. 4A, the ceiling baffle 10 is located below the ceiling hanger 32 and the double arrow 26 of the locking mechanism 22 is just below the two J-shaped ends 38, ready for insertion. As shown in FIG. 4A, the locking mechanism 22 may be spaced from the first wall 82 by a first gap 85 and from the second wall 83 by a second gap 86. The locking mechanism 22 may comprise a first engagement surface 87 that faces the floor 81 of the recess 80 on a first side of the longitudinal axis A-A and a second engagement surface 88 that faces the floor 81 of the recess 80 on a second side of the longitudinal axis A-A. Stated another way, the locking mechanism 22 may comprise a base portion 98 that protrudes from the floor 81 of the recess 80 and a top portion 99 that extends from the base portion 98. The top portion 99 may have a first lower surface portion that protrudes from the base portion 98 towards the first wall 82 of the recess 80 to form the first engagement surface 87 and a second lower surface portion that protrudes from the base portion 98 towards the second wall 83 of the recess 80 to form the second engagement surface 88. The first and second engagement surface 87, 88 may be downwardly facing shoulders. The locking mechanism 22 may further include a first chamfered surface 77 extending from the first engagement surface 87 towards the top end 91 and a second chamfered surface 79 extending from the second engagement surface 88 towards the top end 91.

FIG. 4B shows the locking mechanism 22 as the ceiling baffle 10 is pushed or snapped towards the proper insertion location. As the process described and shown in FIGS. 4A to 4C occurs, any additional locking mechanisms 22 on that same ceiling baffle 10 will simultaneously or almost simultaneously be inserted into other ceiling hangers 32 for support purposes. For example, if there are two locking mechanisms 22 on a ceiling baffle 10, then each of the locking mechanisms 22 will be pushed or snapped (or slid into place) into the ceiling hangers 32 at the same time or almost simultaneously.

As further shown in FIG. 4B, as the ceiling baffle 10 is snapped into the correct location, the J-shaped ends 38 force the double arrows 26 to compress towards each other thereby reducing the size of the cutaway portion 30 between the double arrows 26. At the same time, the J-shaped ends 38 force the outside lower triangle ends 40 of each double arrow 26 down and into the recesses 28 below the double arrows 26. These actions allow the locking mechanism 22 to bypass the J-shaped ends 38 and move into the correct location in the ceiling hanger 32.

Once the double arrows 26 have passed by the J-shaped ends 38, the double arrows 26 spring back, rebound or expand back to their original position, as shown in FIG. 4C. This return to the original position is due to the material used in the ceiling baffle 10. Once expanded back to the original position, the double arrows 26 are prevented from too much side to side movement by the ceiling hanger walls 36, and the ceiling baffle 10 is prevented from falling out of the ceiling hanger 32 due to the outside lower triangle ends 40 of each double arrow 26 resting on the tips 42 of the J-shaped ends 38. To remove the ceiling baffle 10 from the ceiling hanger 32, the reverse of FIGS. 4A through 4C occurs when the ceiling baffle 10 is pulled from the ceiling hanger 32.

As described herein, other materials may be used for the ceiling baffle, or different locking mechanisms (see exemplary FIGS. 19 through 25) can be implemented to achieve the same result, allowing a ceiling baffle to be easily positioned into the proper location in an existing ceiling hanger 32 without additional hardware or tools for installation.

As an example, the locking mechanism can be a spring loaded device, with the spring located between the double arrows, so that when the ceiling baffle is snapped into place, the spring between the double arrows compresses, allowing the locking mechanism to move past the J-shaped ends of the ceiling hanger. Once in place, the spring expands and the double arrows move into place to hold the ceiling baffle in the ceiling hanger.

Figure 5:
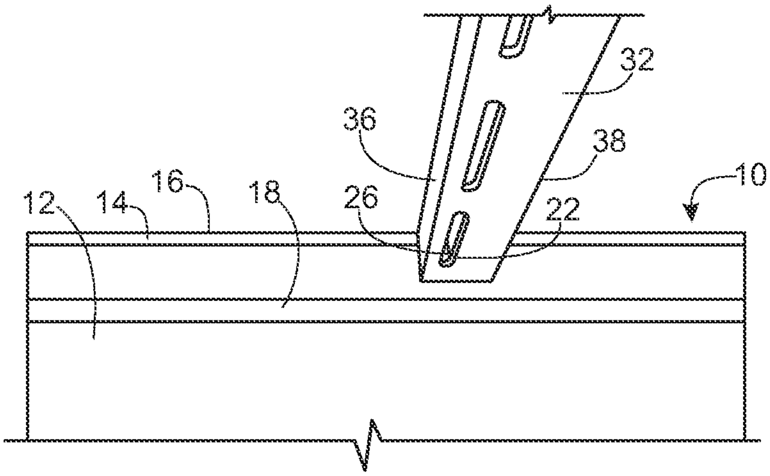
FIG. 5 is a perspective view of a portion of a ceiling baffle with a locking mechanism inserted into a standard ceiling hanger in accordance with the present disclosure.

FIG. 5 shows the improved ceiling baffle 10 inserted or located into a standard UNISTRUT® ceiling hanger 32 in which the locking mechanism 22 can be seen up and inside the ceiling hanger 32 with the two ends of the double arrow 26 locked into the inside of the J-shaped ends 38 of the ceiling hanger 32, as also shown in FIG. 4C.

In this view, the ceiling baffle 10 shows the middle portion 12 and one of the outside portions 14. The outside portion 14 has an upper taper 16 and a lower taper 18 and includes a double arrow 26 for the locking mechanism 22. The perspective view in FIG. 5 shows the ceiling baffle 10 after it has been inserted into the ceiling hanger 32, such that the hanger walls 36 prevent the ceiling baffle 10 from movement in a side to side motion (except for minimal movement), and the ends 42 of the J-shaped ends 38 prevent the ceiling baffle 10 from falling out of the ceiling hanger 32.

FIGS. 6A through 6F show the front views of six differently shaped ceiling baffles 10 in accordance with the present disclosure. Each of the ceiling baffles 10 has a different shape so that when they are installed into the existing ceiling hangers 32 they will form a pattern, such as an undulating pattern based on the different lengths of the baffles. In alternative embodiments disclosed herein, additional shaped ceiling baffles 10 can be used to create other seemingly undulating or moving surfaces, or using the same size ceiling baffles 10 to create a seemingly straight or solid surface.

In the preferred embodiment, the length of each ceiling baffle 10 remains constant at 95 inches to provide a uniform look when the ceiling baffles 10 are installed. Further, the locking mechanism 22 is located the same distance for each ceiling baffle 10, also to provide a uniform look. For example, if the ceiling baffle is 95 inches long, then the two locking mechanisms 22 are located 48 inches apart and 23% inches from the end (at center). This will allow all of the ceiling baffles 10 to be positioned into the ceiling hangers 32 creating a uniform look from below.

However, the bottom edge of each ceiling baffles 10 is shaped differently. For example, in FIG. 6A, the bottom edge 44 shows a (relatively) extreme convex shape, with a maximum height of 9.5 inches. FIG. 6B shows another ceiling baffle 10 design with a convex shape 46, but not as extreme, with a maximum height of 8.5 inches. FIG. 6C shows a slightly less convex shape 48 with a 7-inch height. FIGS. 6D through 6F show ceiling baffles 10 with concave shapes 50, 52, 54, with the maximum height of each ceiling baffle 10 (at the ends of the ceiling baffle 10) corresponding to the maximum height of the ceiling baffles 10 shown in FIGS. 6A through 6C (at the middle of the ceiling baffle 10).

Figure 6A:
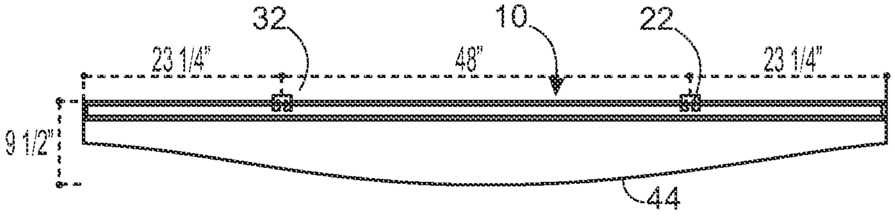
FIGS. 6A through 6F are front views of six differently shaped ceiling baffles in accordance with the present disclosure.
Figure 6B:
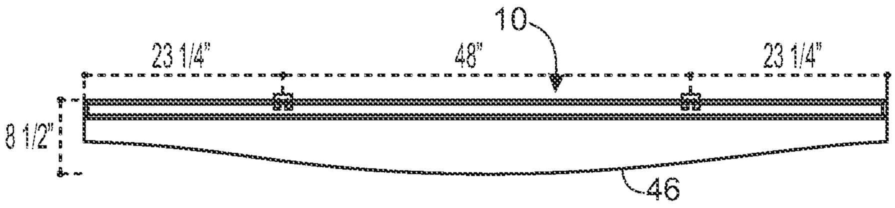
Figure 6C:
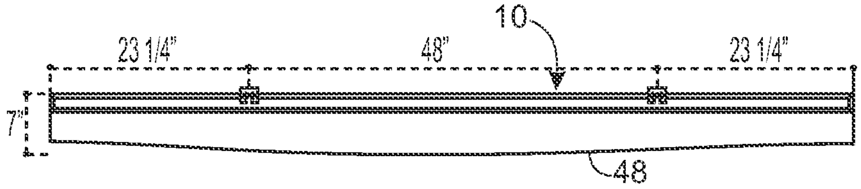
Figure 6D:
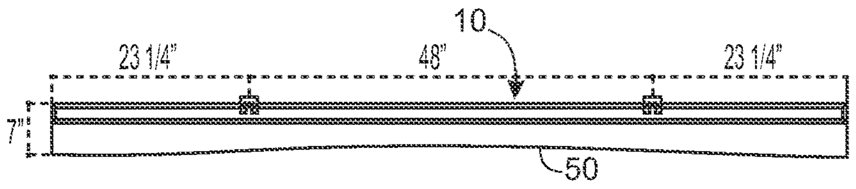
Figure 6E:
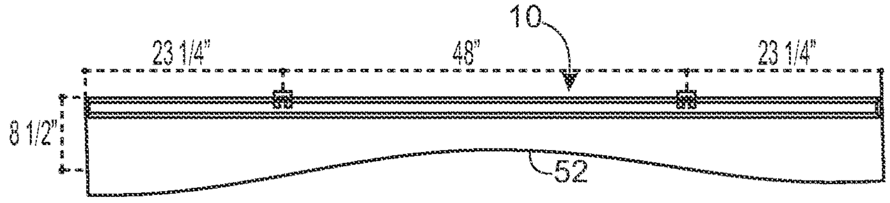
Figure 6F:
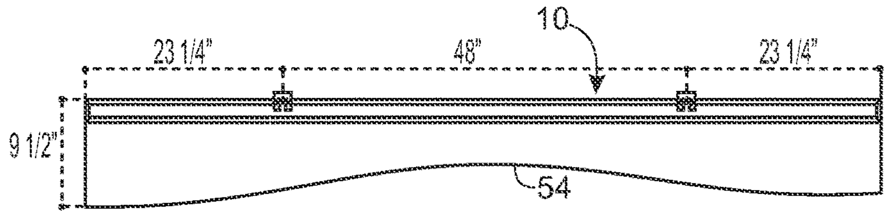

For example, the maximum height of FIGS. 6A and 6F are both 9.5 inches; however, the design in FIG. 6A has the height in the middle of the ceiling baffle 10, while the design in FIG. 6F has the height at the ends of the ceiling baffle 10. The same is accurate for designs shown in 6B and 6E, and also in 6C and 6D. The reasons for this particular design will become apparent as the ceiling baffles are placed in proper sequence as described herein. As can be easily understood and as explained in detail herein, different ceiling baffle 10 designs can be incorporated into the present disclosure without departing from the spirit or scope of this disclosure.

As an example of a ceiling baffle system 100, the preferred embodiment provides for the six different shapes set forth in FIGS. 6A through 6F, that when installed in a repeating pattern can create various images from the ground looking up. For example, if the ceiling baffles 10 are arranged such that the designs shown in the figures are placed into the ceiling hangers 32 in a forward and backward process, an undulating effect or image will be created.

Figure 6G:
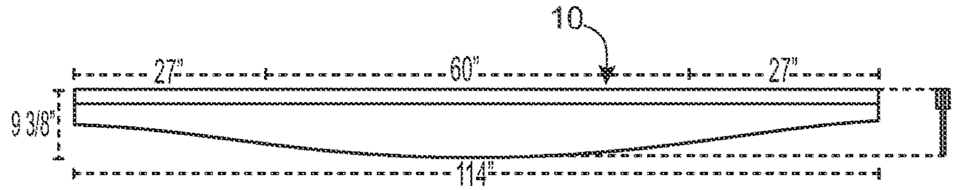
FIGS. 6G through 6N are front views of various differently shaped ceiling baffles in accordance with the present disclosure.
Figure 6H:
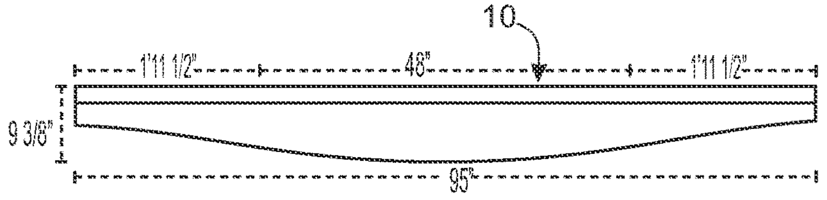
Figure 6I:
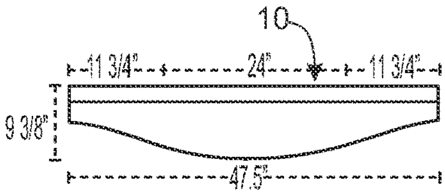
Figure 6J:
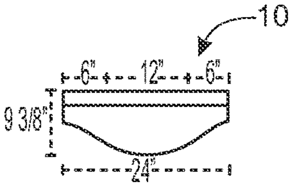
Figure 6K:
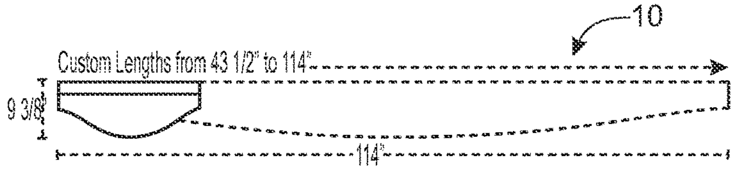
Figure 6L:
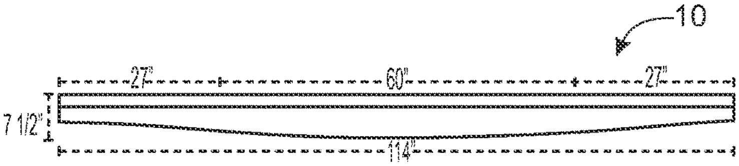
Figure 6M:
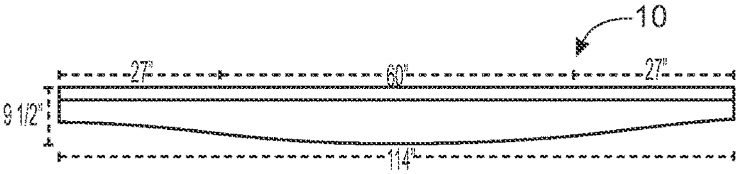
Figure 6N:
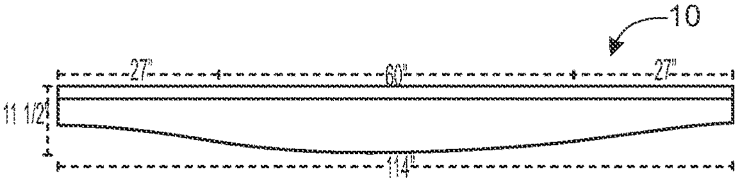

Also, as described herein, the ceiling baffle 10 can be manufactured in various sizes and shapes to be configured for different size and shaped ceilings, to create a different seemingly undulating image. FIGS. 6G through 6N show different standard lengths and standard depths for the various ceiling baffles 10. FIG. 6G for example shows an extra-large ceiling baffle 10 that is 114 inches long and 9⅜ inches deep, while FIG. 6J shows a small ceiling baffle 10 that is 24 inches long and 9⅜ inches deep. Additionally, FIG. 6L shows a ceiling baffle 10 that is 114 inches long and 7½ inches deep, while FIG. 6N shows a ceiling baffle 10 that is 114 inches long and 11½ inches deep. FIG. 6K shows a custom ceiling baffle 10 that can be manufactured from 43½ to 114 inches long, and from 7½ to 11½ inches deep. Of course, other size ceiling baffles 10 can be manufactured in keeping within the scope of the invention.

Figure 7:
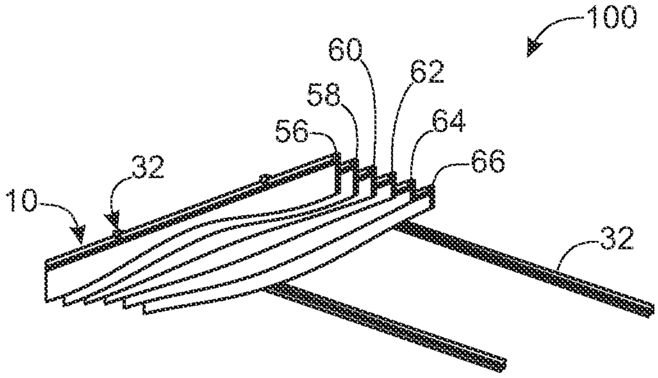
FIG. 7 is a perspective view of the six differently shaped ceiling baffles installed in accordance with the present disclosure.

FIG. 7 shows the beginning of an arrangement as the ceiling baffle 10 designs (FIGS. 6A through and including 6F) are placed into the ceiling hangers 32 in the order as first the design shown in FIG. 6 F 56, the FIG. 6 E 58, then FIG. 6 D 60, then FIG. 6 C 62, then FIG. 6 B 64, and finally FIG. 6 A 66. As such, FIG. 7 shows the beginning of the ceiling baffle system 100. Again, as disclosed throughout the specification, the preferred embodiment locking mechanism 22 can be incorporated to attach the ceiling baffles 10 to the ceiling hangers 32; however, additional locking mechanisms can be incorporated to obtain the same resultant ceiling baffle system 100.

Figure 8:
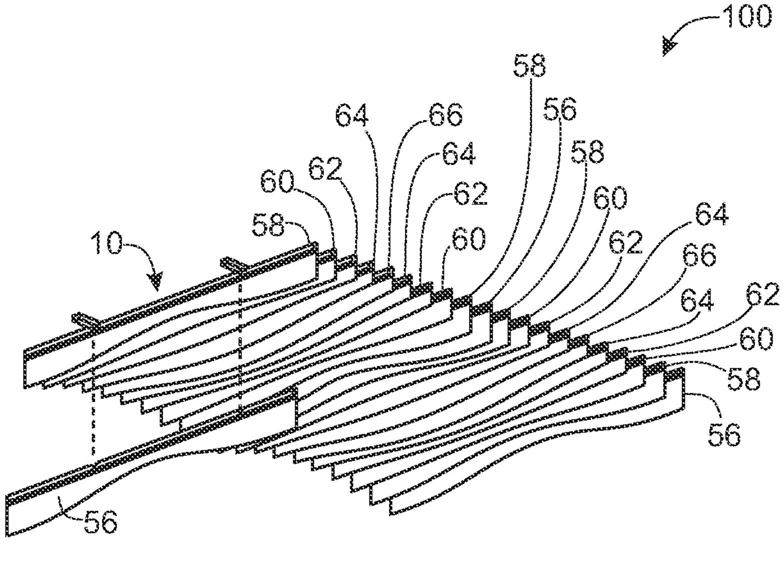
FIG. 8 is a perspective view of the six differently shaped ceiling baffles installed in a pattern in accordance with the present disclosure.

FIG. 8 shows the particular ceiling baffle system 100 with the pattern of ceiling baffle 10 designs continuing to create and undulating or wave feature when viewed from the ground. Once the design shown in FIG. 6 A 66 has been properly placed (position number 6), the pattern continues with the ceiling baffle shown in FIG. 6 B 64. Next, the design shown in FIG. 6 C 62. As understood, the pattern is now reversing itself, and this will continue throughout the ceiling baffle system 100; FIG. 6 D 60. FIG. 6 E 58, FIG. 6 F 56, and then reversing again, FIG. 6 E 58, FIG. 6 D 60, and so on. This will create the undulating feature of the ceiling baffle system 100 shown in FIG. 8.

Figure 9:
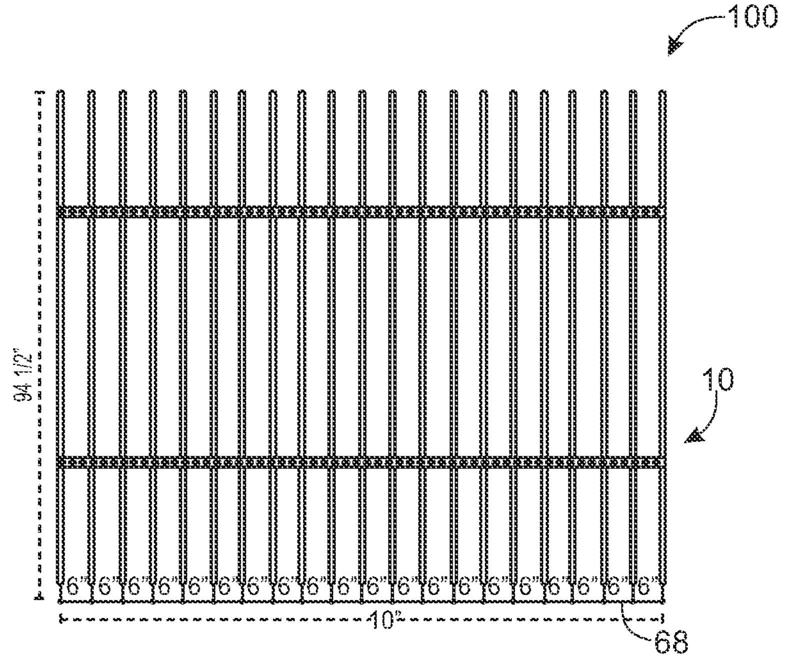
FIG. 9 is a top view of the ceiling baffles installed in the ceiling hanger in accordance with the present disclosure.
Figure 10:
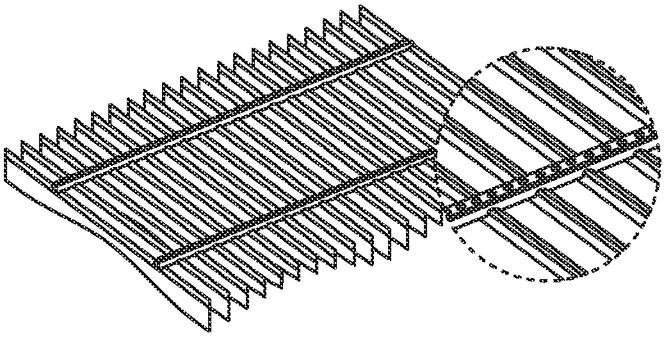
FIG. 10 is a perspective view of the ceiling baffles installed in the ceiling hanger in accordance with the present disclosure as shown in FIG. 9.

FIGS. 9 and 10 show the top view and perspective view of the installation of the ceiling baffle system 100 utilizing spacers 66 between each ceiling baffle 10. In the preferred embodiment, the spacers are 6 inches, providing for a ten-foot ceiling baffle system 100, by using 21 ceiling baffles 10 arranged in the order described above. As such, the ceiling baffle system of the preferred embodiment will cover a ceiling space of approximately 8 feet by ten feet. Additionally, FIGS. 14, 23A, 24A, 25A, 26A, 27, 29, 31 and 33 show alternative embodiment ceiling baffles 10 after being attached, hung or snapped onto the ceiling hangers 32 or the ceiling itself, as described herein.

Of course, a ceiling baffle system 100 may include more or less ceiling baffles 10, or use the exemplary configurations shown in FIGS. 6G through 6N or others, in different arrangements, depending on the desired image to be created. As the present disclosure is not limited to the particular size or shaped baffles described herein, any shaped baffle can be used in the present disclosure to obtain similar results. Further, completely different designs than those shown in FIGS. 6A through 6N can be incorporated into the ceiling baffle system 1K).

As disclosed herein, another non-limiting example, each of the ceiling baffles 10 can be configured identically to each other, such that when installed into the ceiling hangers 32, they do not create an undulating effect or image, and instead create a ceiling baffle system 100 with a consistent curved edge or even a flat or straight image.

Figure 11A:
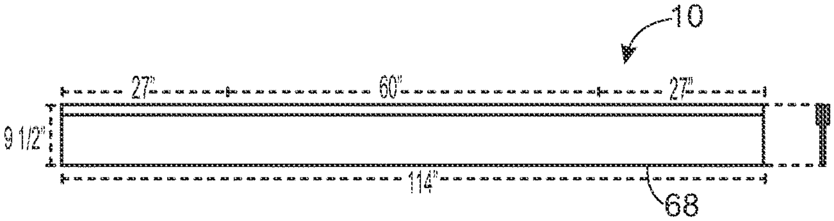
FIGS. 11A through 11H are front views of various differently shaped straight ceiling baffles in accordance with the present disclosure.
Figure 11B:
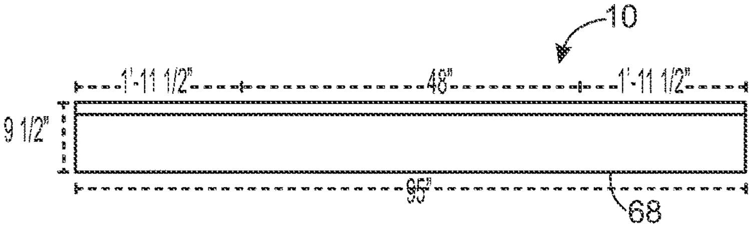
Figure 11C:
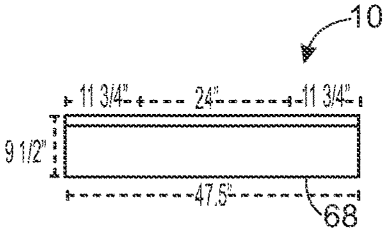
Figure 11D:
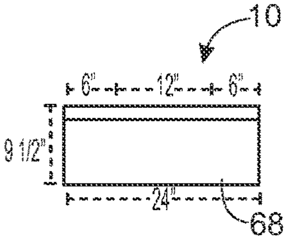
Figure 11E:
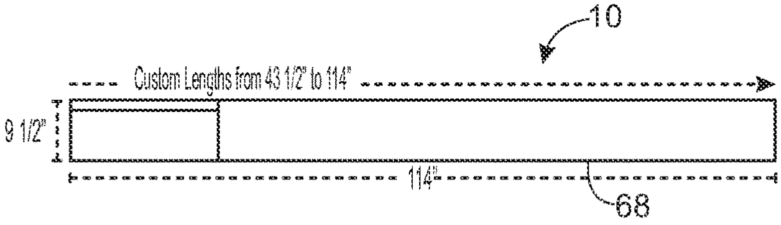
Figure 11F:
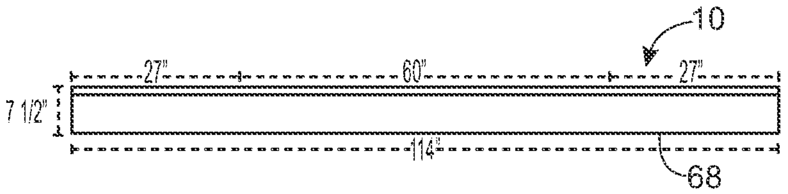
Figure 11G:
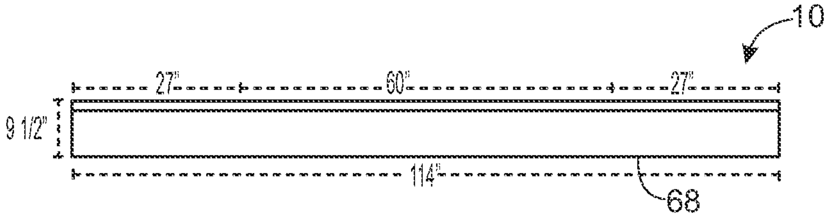
Figure 11H:
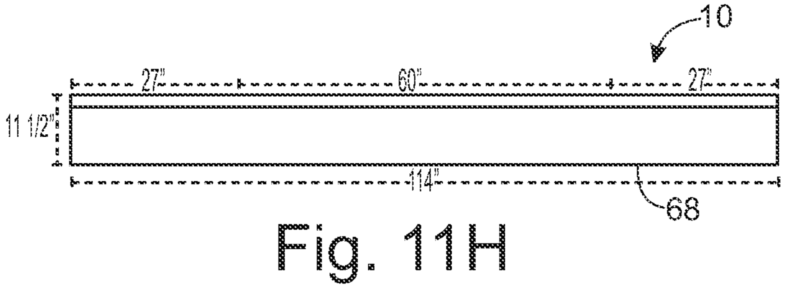

FIGS. 11A through 11H show a ceiling baffle 10 design similar to the curved designs described herein, but with a straight edge 68. These ceiling baffles 10 can be installed as described herein and generate a straight edge ceiling design. As with the curved design, many different sizes can be utilized to generate a different straight-edge effect. FIGS. 11A through 11H show different standard lengths and standard depths for the various ceiling baffles 10. FIG. 11A for example shows an extra-large straight ceiling baffle 10 that is 114 inches long and 9½ inches deep, while FIG. 11D shows a small straight ceiling baffle 10 that is 24 inches long and 9½ inches deep. Additionally, FIG. 11F shows a straight ceiling baffle 10 that is 114 inches long and 7½ inches deep, while FIG. 11H shows a straight ceiling baffle 10 that is 114 inches long and 11½ inches deep. FIG. 11E shows a custom straight ceiling baffle 10 that can be manufactured from 45½ to 114 inches long, and from 7½ to 11½ inches deep. Of course, other size straight ceiling baffles 10 can be manufactured in keeping within the scope of the invention.

Figure 12:
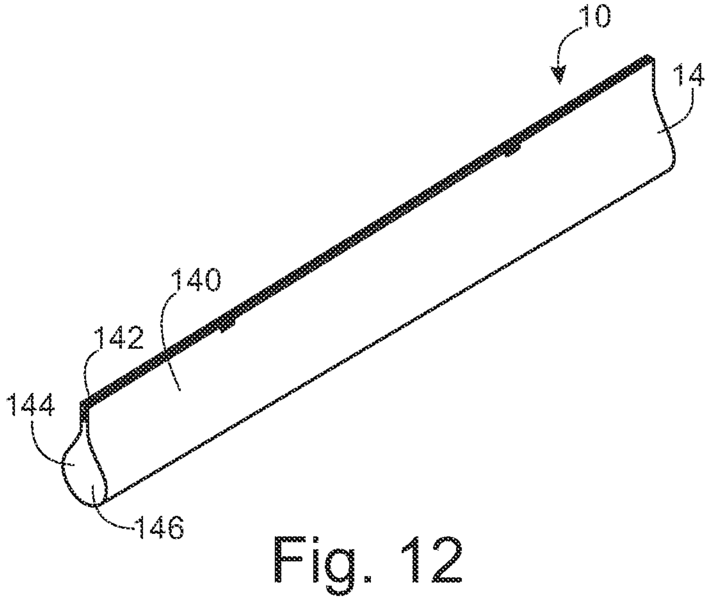
FIG. 12 is a perspective view of a portion of a ceiling baffle with a locking mechanism in accordance with an alternative embodiment of the present disclosure.

Additional ceiling baffle 10 shapes are further contemplated by the present disclosure. FIG. 12 shows a perspective view of an alternative embodiment ceiling baffle 10 that is constructed from a single sheet of 3 mm felt material 140 draped on both sides of 2 adhered 9 mm stiffeners 142 creating a 7 inch wide rain drop profile 144 and a substantial air gap 146. Each drop ceiling baffle 10 has a 0.85 to 1.25 NRC rating and can be made from 99% post-consumer recycled plastic. Of course, other materials can be used to manufacture the ceiling baffle 10, and the ceiling baffle 10 can be configured in other shapes.

Figure 13A:
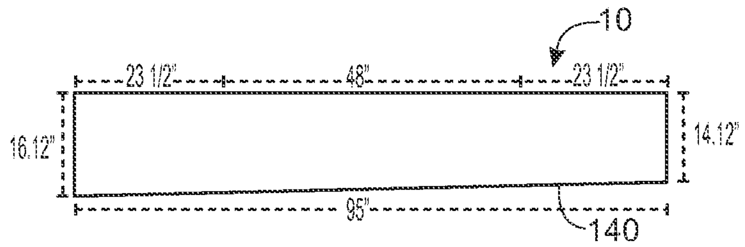
FIGS. 13A through 13D are front views of four differently shaped ceiling baffles in accordance with an alternative embodiment of the present disclosure/
Figure 13B:
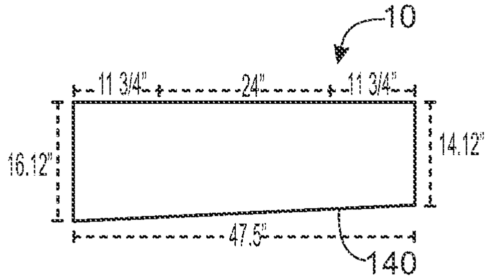
Figure 13C:
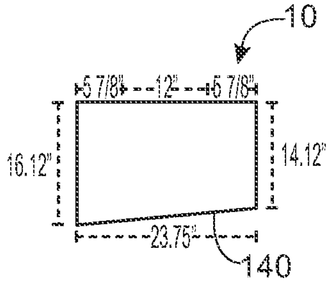
Figure 13D:
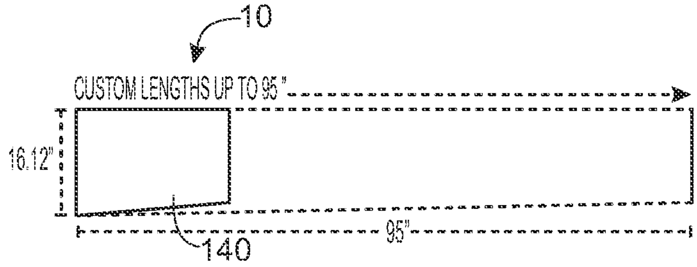

The drop design ceiling baffle 10 can be manufactured in different sizes to create a ceiling baffle system 100 that uses the same size ceiling baffles 10 or different sized ceiling baffles 10. FIGS. 13A through 13D show the drop ceiling baffle 10 design, which can be installed as described herein, and which is similar to the previously described ceiling baffles 10, but with the drop design 144. These ceiling baffles 10 can be installed to generate a consistently sized drop ceiling design, or using differently sized drop ceiling baffles 10 to create an undulating effect. FIGS. 13A through 13 D for example show standard and custom lengths for using the same size drop ceiling baffle 10 throughout the ceiling baffle system 100. For example, FIG. 13A shows the front view of a large drop ceiling baffle 10 that is 95 inches long and 16½ inches deep, while FIG. 13C shows a small drop ceiling baffle 10 that is 23¾ inches long and 162 inches deep. Additionally, FIG. 13D shows a custom drop ceiling baffle 10 that can be manufactured up to 95 inches long, and 16½ inches deep. Of course, other size drop ceiling baffles 10 can be manufactured in keeping within the scope of the invention.

Figure 14:
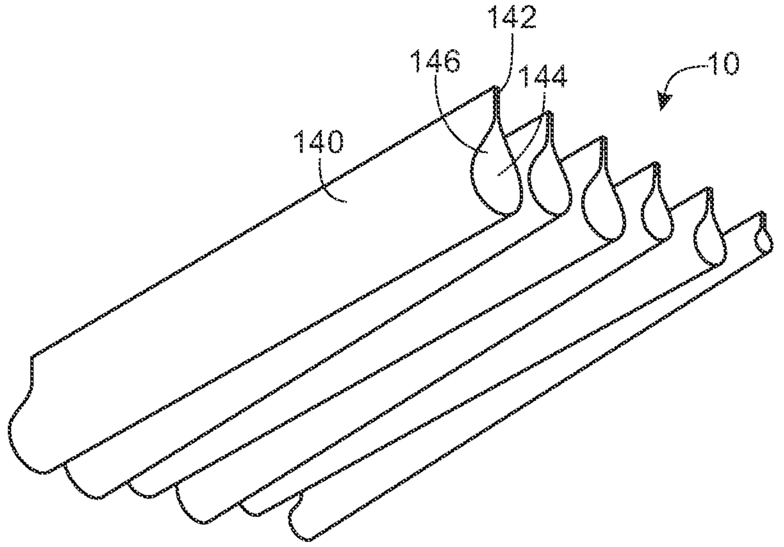
FIG. 14 is a perspective view of a portion of a ceiling baffle with a locking mechanism in accordance with an alternative embodiment of the present disclosure.
Figure 15A:
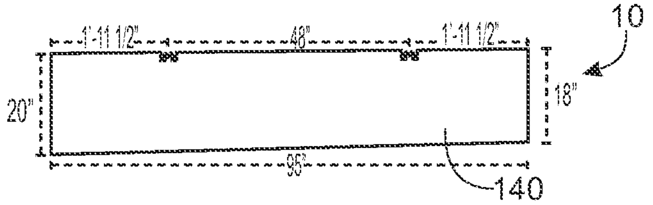
FIGS. 15A through 15F are front views of six differently shaped ceiling baffles in accordance with an alternative embodiment of the present disclosure.
Figure 15B:
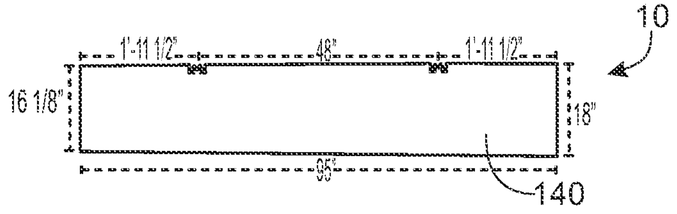
Figure 15C:
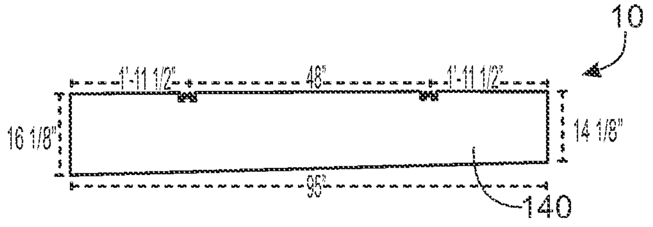
Figure 15D:
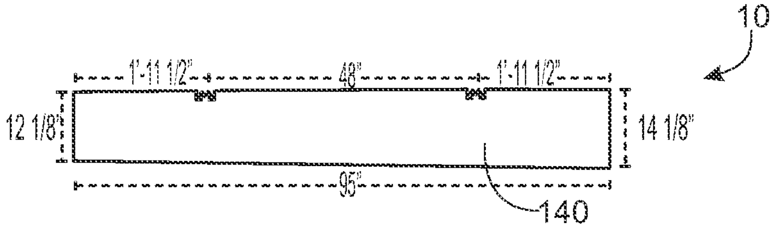
Figure 15E:
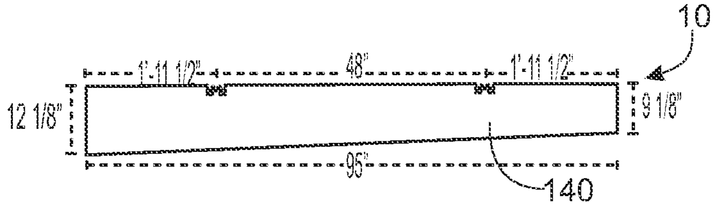
Figure 15F:
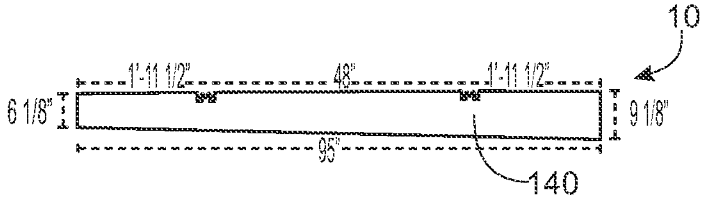

Along those lines. FIG. 14 shows a ceiling baffle system 100 utilizing six different drop ceiling baffle 10 designs to create an undulating image from the ceiling. The six different ceiling baffles 10 shown in FIG. 14 pertain to the front view in FIGS. 15A through 15F, respectively. These examples include FIG. 15A, which shows the front view of a drop ceiling baffle 10 that is 95 inches long and 20 inches deep; FIG. 15B, which shows the front view of a large drop ceiling baffle 10 that is 95 inches long and 16⅛ inches deep; FIG. 15C, which shows the front view of a large drop ceiling baffle 10 that is 95 inches long and 16⅛ inches deep; FIG. 15D, which shows the front view of a large drop ceiling baffle 10 that is 95 inches long and 12⅛ inches deep; FIG. 15E, which shows the front view of a large drop ceiling baffle 10 that is 95 inches long and 12⅛ inches deep; and FIG. 15F, which shows the front view of a large drop ceiling baffle 10 that is 95 inches long and 6⅛ inches deep. By alternating these differently sized drop ceiling baffles 10, as shown in FIG. 14, the ceiling baffle system 100 will create an undulating effect. Of course, other sizes and combinations can be used for similar or different effect.

Figure 16:
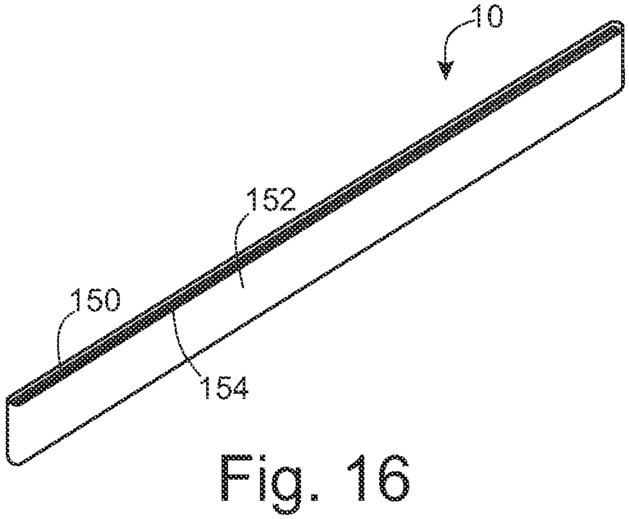
FIG. 16 is a perspective view of a portion of a ceiling baffle with a locking mechanism in accordance with an alternative embodiment of the present disclosure.

FIG. 16 shows a perspective view of yet another alternative embodiment ceiling baffle 10 that is constructed from a sheet of 9 mm felt material 150 folded and wrapped in 3 mm felt material 152 creating the warp design visual effect of a 1.875 mmn thick rounded slab of felt. Each warp ceiling baffle 10 is equipped with a 1-inch thick air gap 154 with a 1.55 NRC rating and can be made from 99% post-consumer recycled plastic. Of course, other materials can be used to manufacture the warp ceiling baffle 10, and the warp ceiling baffle 10 can be configured in other shapes.

Figure 16A:
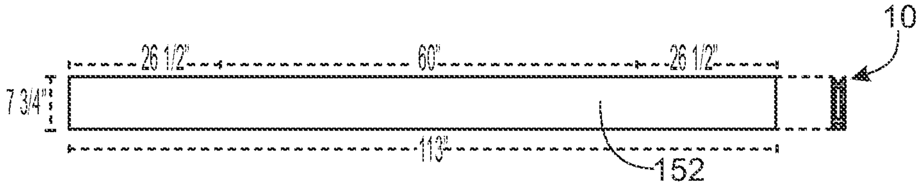
FIGS. 16A through 16D are front views of six differently shaped ceiling baffles in accordance with an alternative embodiment of the present disclosure.
Figure 16B:
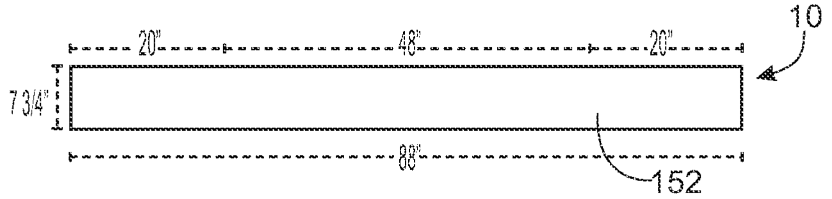
Figure 16C:
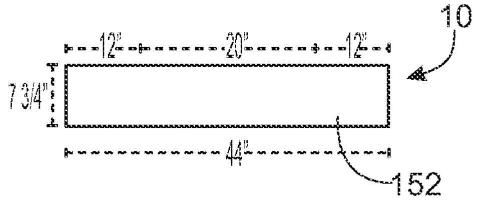
Figure 16D:
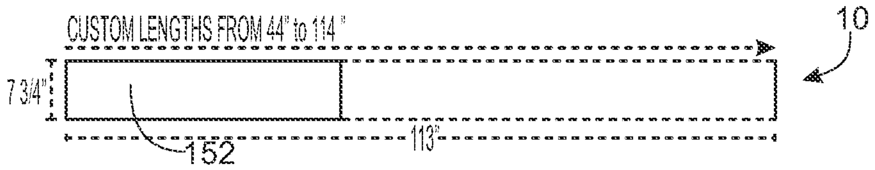

The warp ceiling baffle 10 can be manufactured in different sizes to create a ceiling baffle system 100 that uses the same size ceiling baffles 10 or different sized ceiling baffles 10. FIGS. 16A through 16D show the warp ceiling baffle 10 design, which can be installed as described herein, and which is similar to the previously described ceiling baffles 10, but with the warp design. These ceiling baffles 10 can be installed to generate a consistently sized warp ceiling design, or using differently sized warp ceiling baffles 10 to create a different effect. FIGS. 16A through 16 D for example show standard and custom lengths for using the warp ceiling baffle 10 throughout the ceiling baffle system 100. For example, FIG. 16A shows the front view of a large warp ceiling baffle 10 that is 113 inches long and 7¾ inches deep, while FIG. 16C shows a small warp ceiling baffle 10 that is 44 inches long and 7¾ inches deep. Additionally, FIG. 161) shows a custom drop ceiling baffle 10 that can be manufactured from to 44 inches to 114 inches long, and 7¾ inches deep. Of course, other size warp ceiling baffles 10 can be manufactured in keeping within the scope of the invention.

Accordingly, the ceiling baffles 10 described herein along with other ceiling baffles 10 of different shapes and sizes can be incorporated into various ceiling baffle systems 100 and fall within the scope of the present disclosure.

As described herein, the material used in the preferred embodiment is polyester felt and is 99% recycled. The ceiling baffles 10 in the preferred embodiment are 9 mm thick, creating a 27 mm thickness in various areas when the pieces are laminated together, with a maximum size of 9.5 inches by 95 inches and the baffles between 5 inches at the shortest height and 9.5 inches at the longest height. The edge options are exposed felt, and maintenance includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue. Of course, the ceiling baffles 10 can be manufactured in many other colors and the present disclosure is not limited to these specifications and colors, as these are merely the specifications and colors for the preferred embodiments and alternative embodiments.

FIG. 17 shows a chart for the acoustic testing standard ASTM C423 for the ceiling baffles 10 in the preferred embodiment. The chart indicates testing on the preferred embodiment and provides the results of the sound absorption coefficient for the ceiling baffle 10 at various frequencies. The test arrangement used a +100 mm air layer filled with 50 mm rock wool board. As described herein, the noise reduction coefficient at 500 Hz 70 is 0.76 72, and at 1000 Hz 74 is 1.00 76. Further the ceiling baffles 10 are fire rated as UL tested ASTM E-84: Class A.

Figure 18:
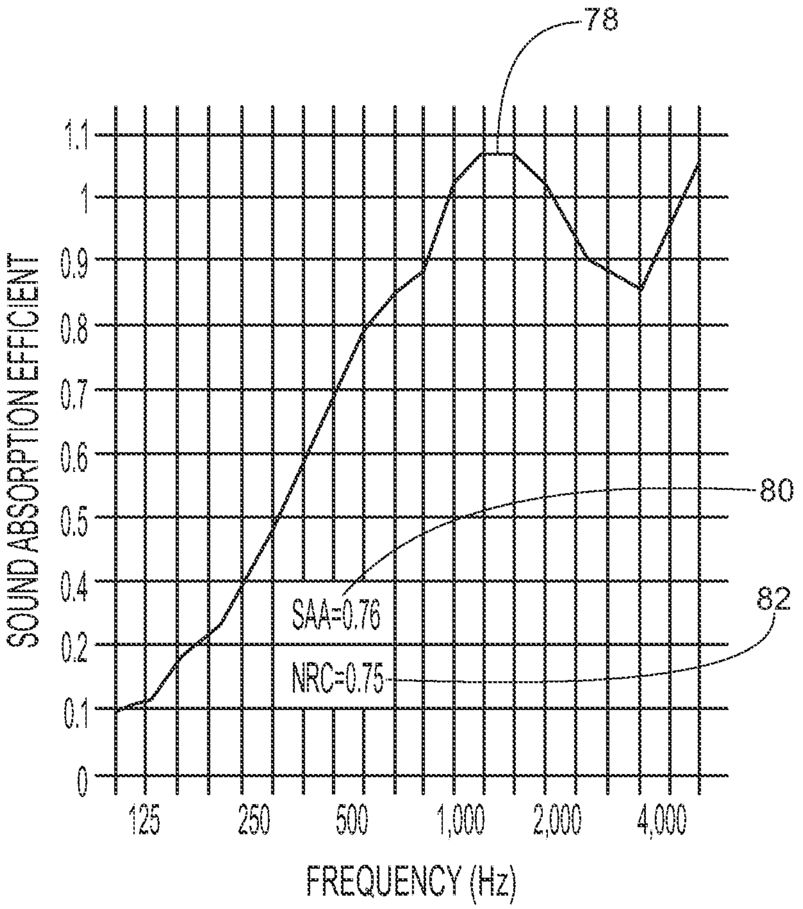
FIG. 18 is a graph of acoustic testing in accordance with ASTM C423 of the ceiling baffles in accordance with the present disclosure.

FIG. 18 shows the graph 78 of the sound absorption coefficient against frequency for the same test, with the sound absorption average (SAA) 80 of 0.76, and the noise reduction coefficient (NRC) 82 of 0.75.

As disclosed above, alternative embodiment locking mechanisms exist that can be incorporated into the ceiling baffles 10 disclosed herein to accomplish a similar ease of attachment of the ceiling baffle 10 to the ceiling hanger 32, the ceiling, or any other ceiling structure.

FIGS. 19 through 25 show alternative embodiments for the locking mechanism design in which the locking mechanism is configured or designed to mate to other ceiling hangers or exposed structures, such as beams, pipes, cables, magnets or clips, all having different shapes, devices or materials than the ceiling hanger 32 described herein. Each of these ceiling baffle 10 alternative embodiments can be manufactured using PET Felt and the laminated configuration described herein, or other materials necessary for making the connection.

As for the preferred embodiment however, the scope of the invention is not so limited and other materials, with similar capabilities, such as rubber, plastic, metal or wood, could be used, all as either as a unitary design or as a laminate, as long as the configuration or design allows for the locking mechanism to compress or expand to mate with the hanger or structure and then snap into place by returning to its original shape once it has been properly placed in or around the hanger or structure and can be held in that location.

Figure 19:
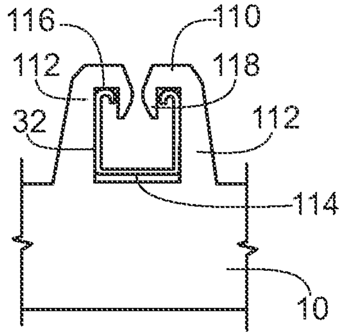
FIG. 19 is a front view of a locking mechanism of a ceiling baffle in accordance with the present disclosure.

FIG. 19 shows an alternative design in which the locking mechanism 110 is configured to be locked onto a similar ceiling hanger 32, but in which the ceiling hanger 32 is used in an upside down configuration. The locking mechanism 110 is configured with two hooks 112 that can expand outwardly as they are pushed against the back side 114 of the ceiling hanger 32, and will return to their original position (shown) when they reach the top 116 of the ceiling hanger 32. Once the hooks 112 return to their original position, the ceiling baffle 10 can be dropped slightly to allow the edges 118 of the hooks 112 to lock into the position holding the ceiling baffle 10 in place.

Figure 20:
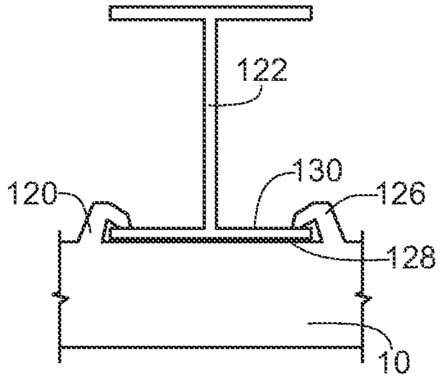
FIG. 20 is a front view of a locking mechanism of a ceiling baffle in accordance with an alternative embodiment of the present disclosure.
Figure 21:
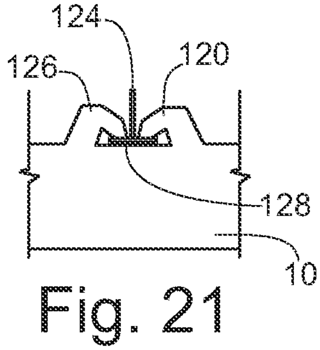
FIG. 21 is a front view of a locking mechanism of a ceiling baffle in accordance with an alternative embodiment of the present disclosure.

FIGS. 20 and 21 show other alternative designs in which the locking mechanism 120 is configured to be locked onto a large I-beam 122 and a smaller T-beam 124, respectively, as examples. The locking mechanism 120 is configured with two latches 126 that can expand outwardly as they are pushed against the back 128 of the I-beam 122 or T-beam 124, and will return to their original position (shown) when they reach the top portion 130 of the I-beam 122 or T-beam 124. As shown in FIGS. 20 and 21, respectively, the latches 126 can be placed further apart from each other or closer together, depending on the beam design. When the latches 126 return to their original position, after passing the top portion 130 of the beam 122, 124 the ceiling baffle 10 will be held in place.

Figure 22:
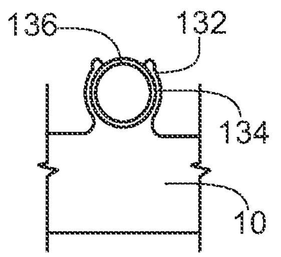
FIG. 22 is a front view of a locking mechanism of a ceiling baffle in accordance with an alternative embodiment of the present disclosure.

FIG. 22 shows yet another alternative design in which the locking mechanism 132 is configured to be locked onto a round pipe, or similarly shaped pipe or conduit 134. The locking mechanism 132 is configured with two rounded prongs 134 that can expand outwardly as they are pushed against the pipe or conduit 136, and will return to their original position (shown) when they reach the proper location against the pipe or conduit 136. Once the prongs 134 return to their original position, the ceiling baffle 10 will be held in place.

Figure 23A:
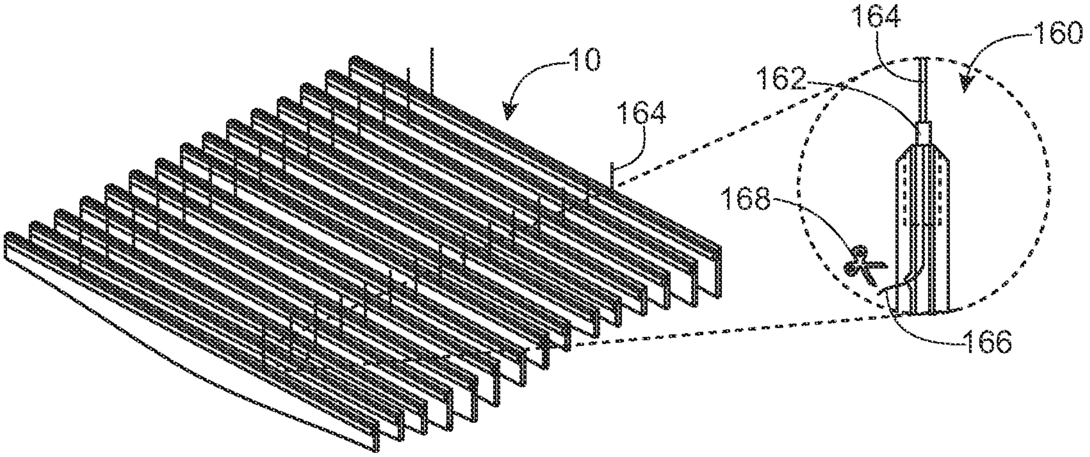
FIGS. 23A and 23B are perspective views of an attachment mechanism of a ceiling baffle in accordance with an alternative embodiment of the present disclosure.
Figure 23B:
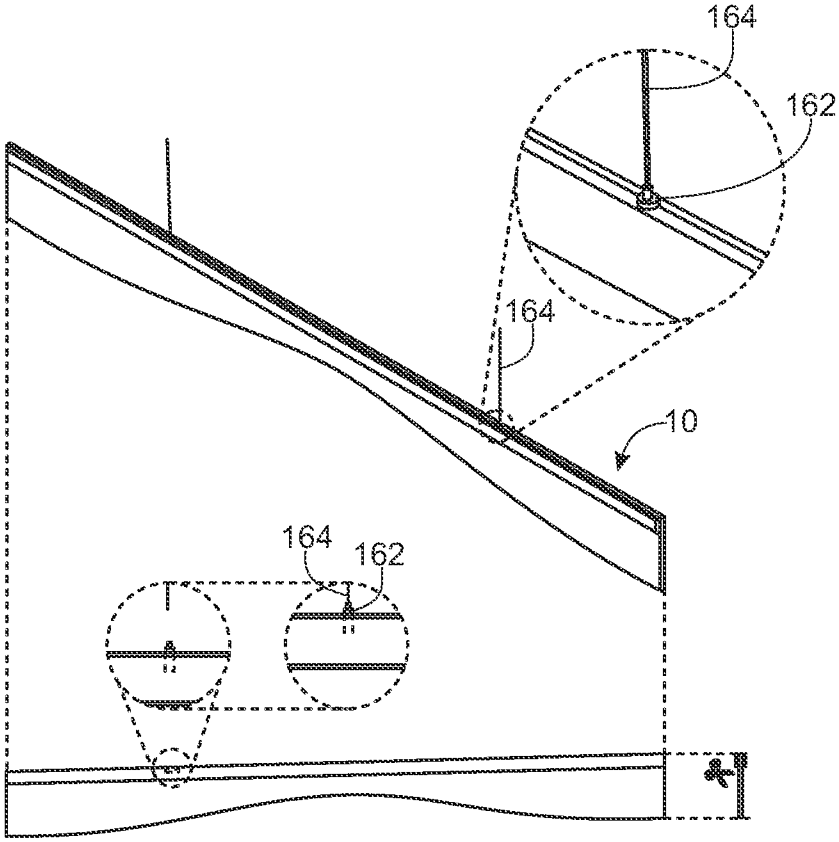

Alternative embodiments exist for attaching a ceiling baffle 10 to a ceiling. One alternative embodiment is shown in FIGS. 23A and 23B and utilizes a cable suspension system 160 in which the ceiling baffles 10 have an embedded cable gripper 162 such that the ceiling baffle 10 (here shown as a curved baffle) can be snapped into deck-mounted aircraft cables 164. The aircraft cables 164 can be arranged in any desired pattern or configuration and once installed, the excess cable 166 will protrude through the ceiling baffle 10 and can be cut off with a scissors 168.

Figure 24A:
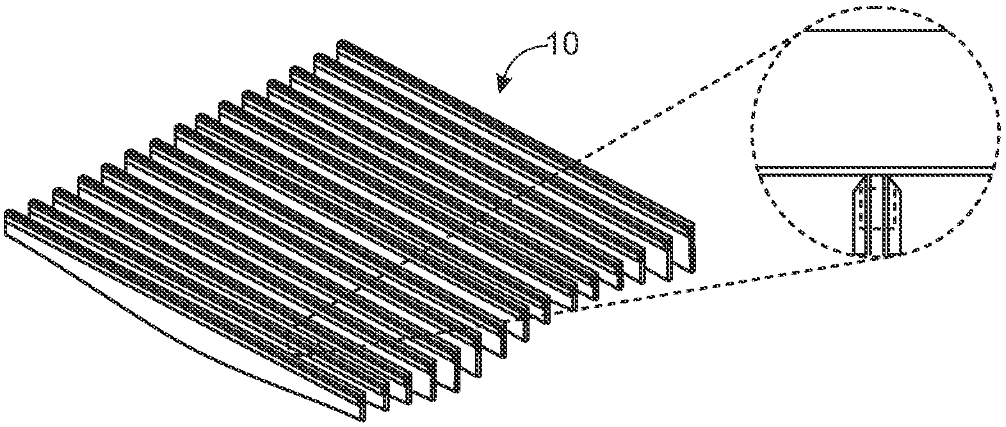
FIGS. 24A and 24B are perspective views of a locking mechanism of a ceiling baffle in accordance with an alternative embodiment of the present disclosure.
Figure 24B:
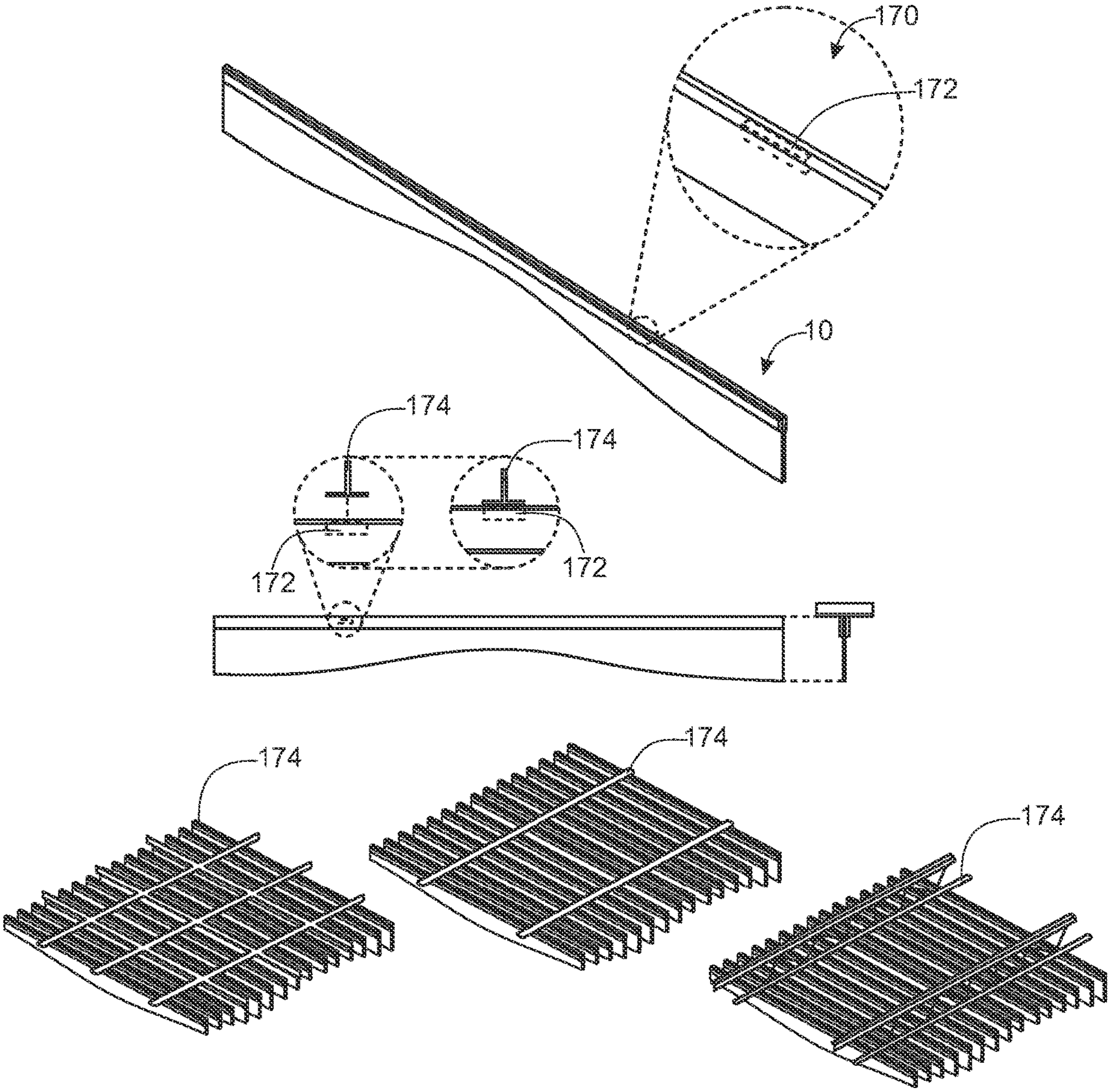

Another alternative embodiment for attaching a ceiling baffle 10 to a ceiling, is shown in FIGS. 24A and 24B and utilizes a magnetic connection system 170. The ceiling baffles 10 are embedded with magnets 172 such that they will connect and hang onto any ceiling or ceiling structure 174 that is made from any ferrous metal material, such as a Unistrut, tee bar or steel joist, among others. The ceiling baffle 10 containing the magnet 172 can be snapped into place adjacent the ferrous metal structure in any desired pattern or configuration.

Figure 25A:
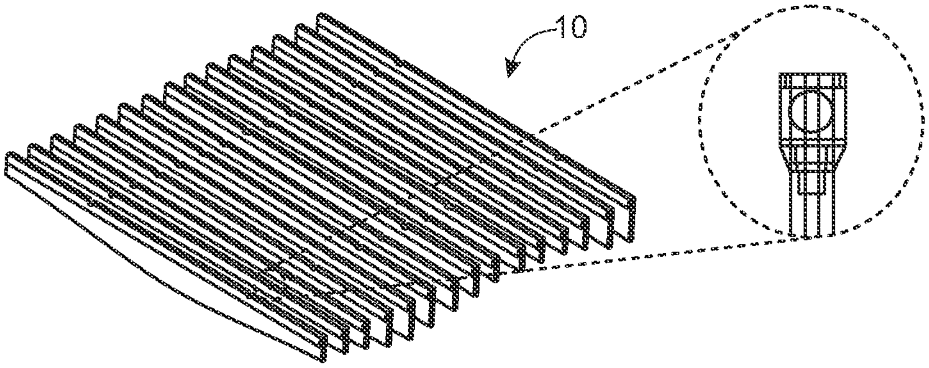
FIGS. 25A and 25B are perspective views of a locking mechanism of a ceiling baffle in accordance with an alternative embodiment of the present disclosure.
Figure 25B:
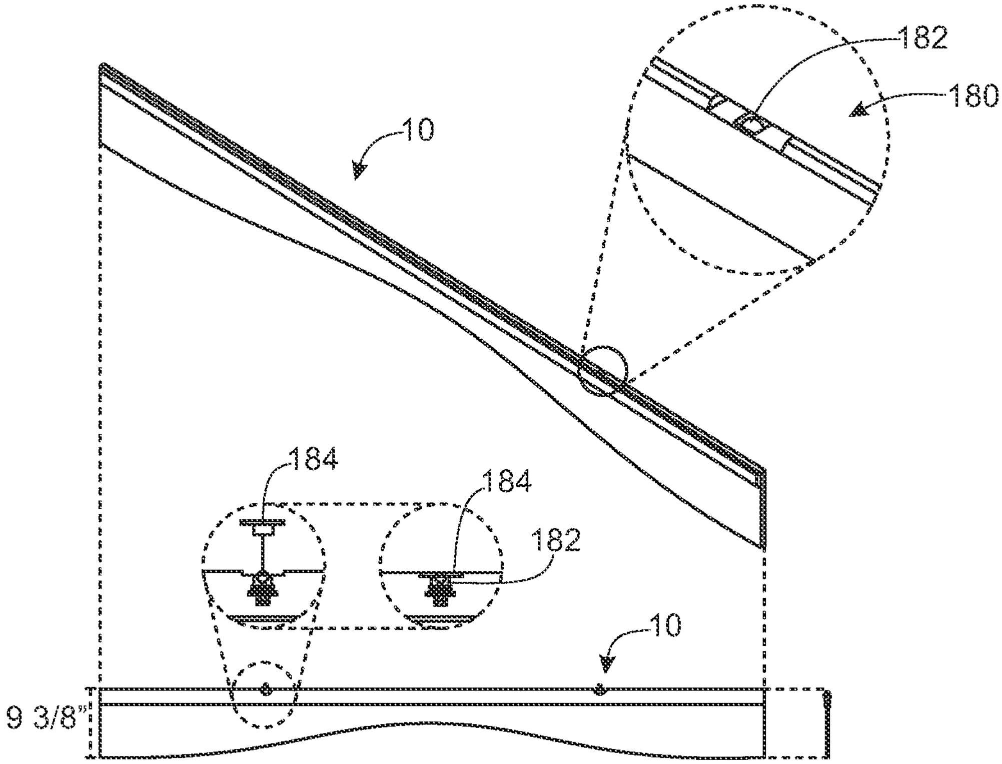

Yet another alternative embodiment for attaching a ceiling baffle 10 to a ceiling, is shown in FIGS. 25A and 25B and utilizes a panel clip system 180. The ceiling baffles 10 are embedded with male panel clips 182 such that they will connect and hang onto any ceiling mounted female panel clip 184. The ceiling baffle 10 containing the male panel clip 182 can be snapped into place into the ceiling mounted female panel clip 184 in any desired pattern or configuration.

Figure 26:
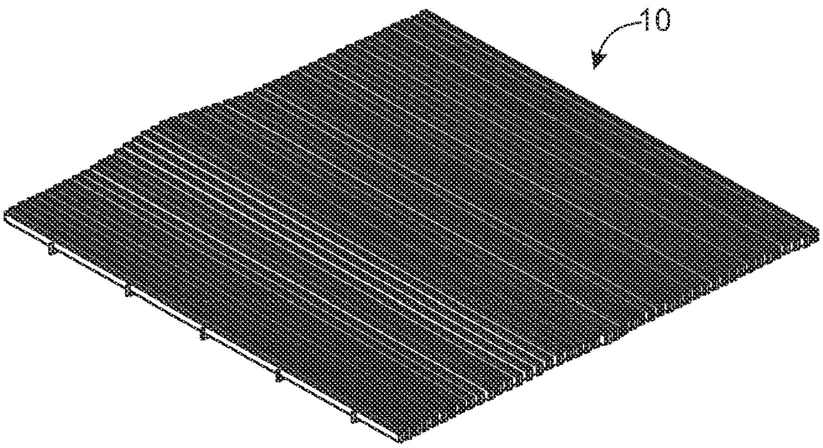
FIG. 26 is a top view of the ceiling baffles installed in the ceiling hanger in accordance with the present disclosure.

Similar to the disclosure above of alternative embodiment ceiling baffles 10 and ceiling baffle systems 100, FIG. 26 shows a ceiling baffle system 100 utilizing six different canopy ceiling baffle 10 designs repeating to create an undulating canopy image from the ceiling. The different ceiling baffles 10 shown in FIG. 26 pertain to the front view in FIGS. 27A through 27F.

Figure 27A:
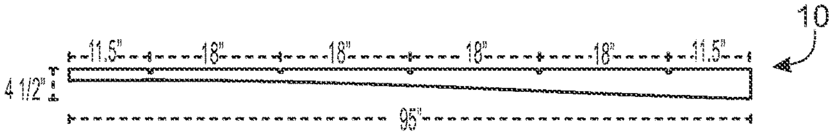
FIGS. 27A through 27F are front views of differently shaped ceiling baffles in accordance with the present disclosure.
Figure 27B:
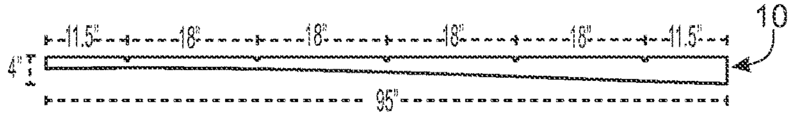
Figure 27C:
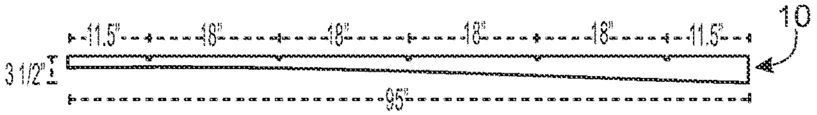
Figure 27D:
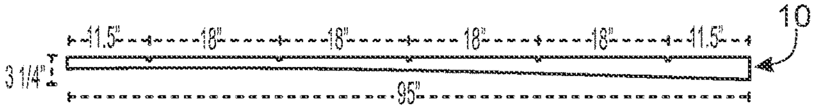
Figure 27E:
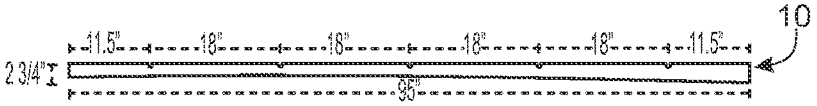
Figure 27F:
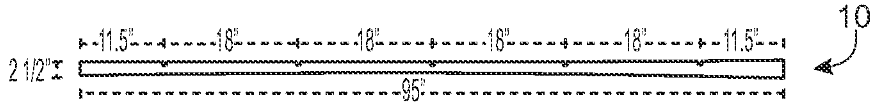

The examples from FIG. 26 include FIG. 27A, which shows the front view of a canopy ceiling baffle 10 that is 95 inches long and 4.5 inches deep at its deepest point and tapers off to 2.5 inches deep at the other end; FIG. 27B, which shows the front view of a canopy ceiling baffle 10 that is 95 inches long and 4 inches deep and tapers off to 2.5 inches deep at the other end; FIG. 27C, which shows the front view of a large canopy ceiling baffle 10 that is 95 inches long and 3.5 inches deep and tapers off to 2.5 inches deep at the other end; FIG. 27D, which shows the front view of a large canopy ceiling baffle 10 that is 95 inches long and 3.25 inches deep and tapers off to 2.5 inches deep at the other end; FIG. 27E, which shows the front view of a large canopy ceiling baffle 10 that is 95 inches long and 2.75 inches deep and tapers off to 2.5 inches deep at the other end; and FIG. 27F, which shows the front view of a large canopy ceiling baffle 10 that is 95 inches long and 2.5 inches deep and tapers off (slight indentation for effect) to 2.5 inches deep at the other end. By alternating these differently sized canopy ceiling baffles 10, as shown in FIG. 26, the ceiling baffle system 100 will create an undulating canopy effect. Of course, other sizes and combinations can be used for similar or different effect.

Figure 28:
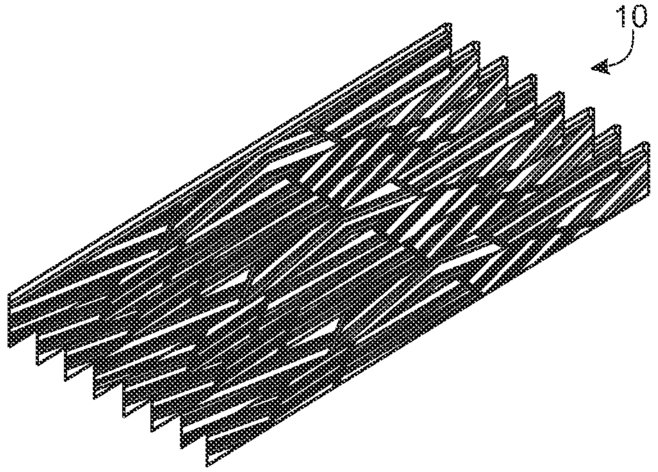
FIG. 28 is a top view of the ceiling baffles installed in the ceiling hanger in accordance with the present disclosure.

Another embodiment, similar to the disclosure above, of ceiling baffles 10 and ceiling baffle systems 100, is shown in FIG. 28 of a baffle system 100 utilizing four different carved ceiling baffle 10 designs, which can be sized and repeated to create a carved baffle image from the ceiling. The different ceiling baffles 10 shown in FIG. 28 pertain to the front view in FIGS. 29A through 29L, as described herein.

FIGS. 29A through 29D show the front views of four different ceiling baffle 10 designs in accordance with the present disclosure. Each of the ceiling baffles 10 has a different design so that when they are installed into the existing ceiling hangers 32, or otherwise attached to the ceiling, they will form a carved baffle pattern. The length of each carved ceiling baffle 10 can remain constant at 95 inches long and 11.5 inches high to provide a uniform look when the ceiling baffles 10 are installed (see FIG. 28), however, each of the ceiling baffles 10 contains a different design, thereby changing the image of the ceiling baffle system 100.

Figure 29A:
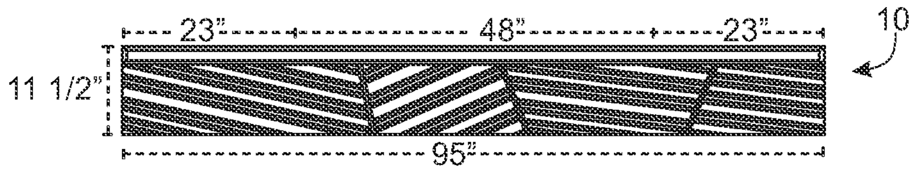
FIGS. 29A through 29L are front views of differently shaped ceiling baffles in accordance with the present disclosure.
Figure 29B:
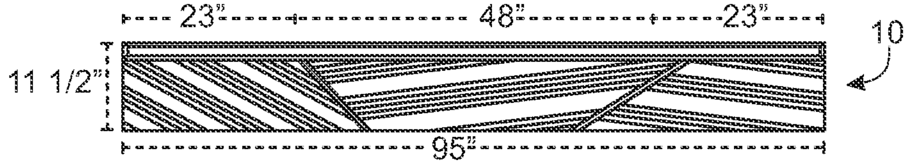
Figure 29C:
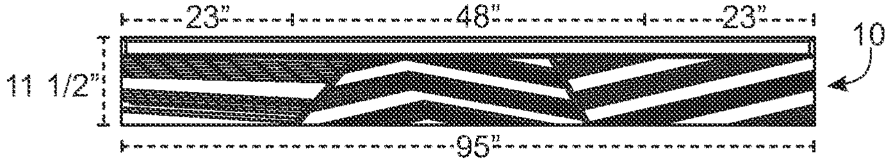
Figure 29D:
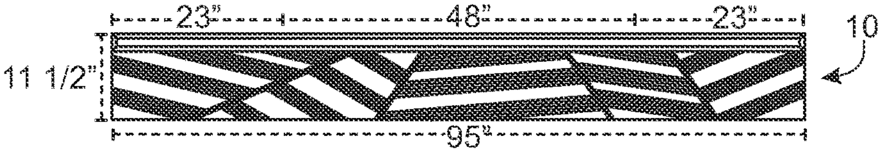

For example, in FIG. 29A, the design includes four sections of alternating light and dark stripes. FIG. 29B shows another ceiling baffle 10 design with three sections of alternating light and dark stripes, but some of the dark stripes contain additional light stripes to soften the design. FIG. 29C shows a design, again with four sections, but the light and dark stripes meet each other in the center sections. Finally, FIG. 29D shows a similar design to that of 29C, but with five separate sections. Of course, other designs can be used to obtain similar results.

Figure 29E:
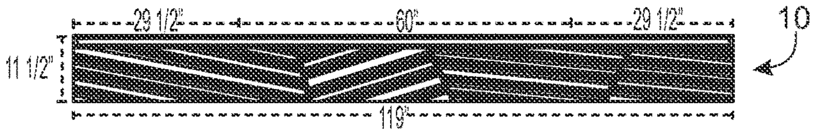
Figure 29F:
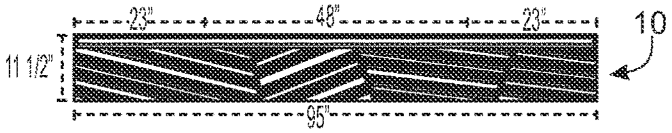
Figure 29G:
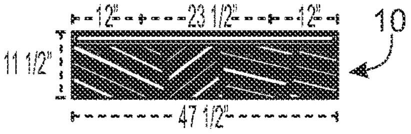
Figure 29H:
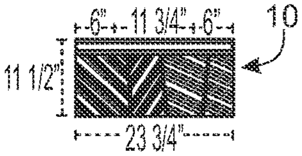
Figure 29I:
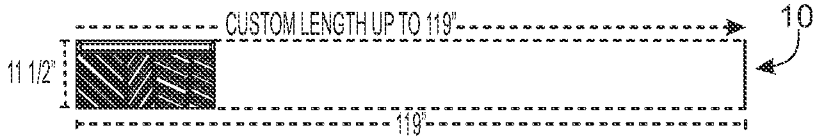
Figure 29J:
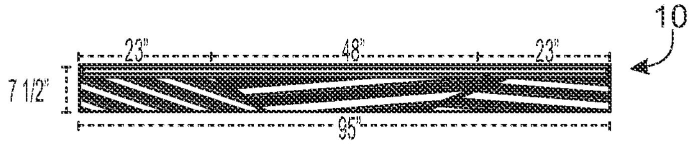
Figure 29K:
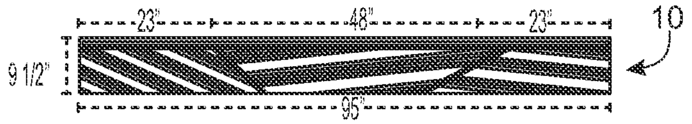
Figure 29L:
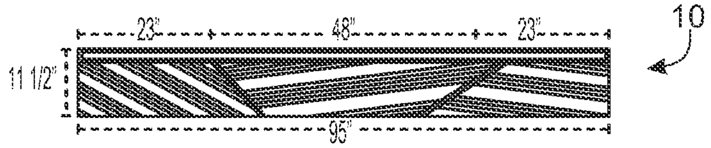

As described above, the carved ceiling baffle 10 design can be manufactured in various sizes and shapes to be configured for different size and shaped ceilings, to create the carved baffle image. FIGS. 29E through 29L show different standard lengths and standard depths for the various carved ceiling baffles 10. FIG. 29E for example shows an extra-large carved ceiling baffle 10 that is 119 inches long and 11.5 inches deep, while FIG. 29H shows a small carved ceiling baffle 10 that is 23.75 inches long and 11.5 inches deep. Additionally. FIG. 29J shows a carved ceiling baffle 10 that is 95 inches long and 7½ inches deep, while FIG. 29L shows a carved ceiling baffle 10 that is 95 inches long and 11½ inches deep. FIG. 29I shows a custom carved ceiling baffle 10 that can be manufactured from 23.75 to 119 inches long, and 11½ inches deep. Of course, other size carved ceiling baffles 10 can be manufactured in keeping within the scope of the invention.

Figure 30:
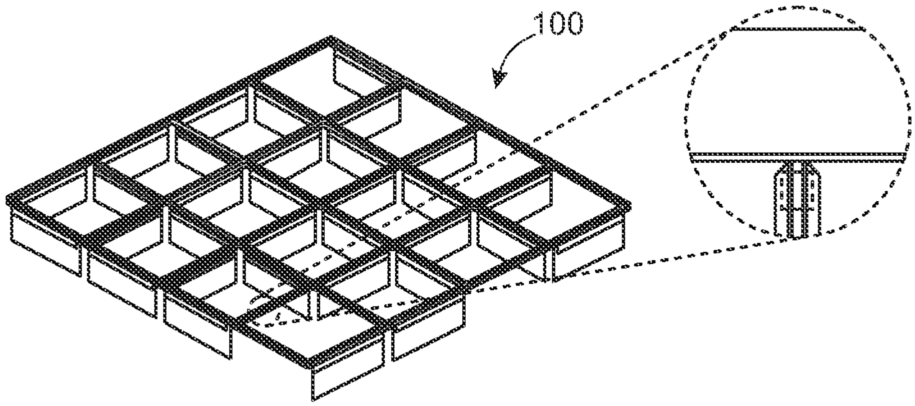
FIG. 30 is a top view of the ceiling baffles installed in the ceiling hanger in accordance with the present disclosure.

Yet another alternative embodiment of ceiling baffles 10 and ceiling baffle systems 100, is shown in FIG. 30 of a baffle system 100 utilizing different sized dash ceiling baffle 10 designs, which can be sized and repeated to create a dash baffle image, including baffles 10 running perpendicular to each other, from the ceiling. The different dash ceiling baffles 10 shown in FIG. 30 pertain to the front view in FIGS. 31A through 31F, and are meant to be installed using the magnetic locking mechanism, as described herein.

Figure 31A:
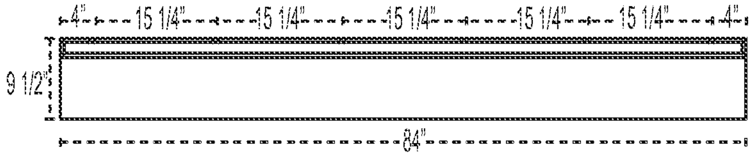
FIGS. 31A through 31F are front views of differently shaped ceiling baffles in accordance with the present disclosure.
Figure 31B:
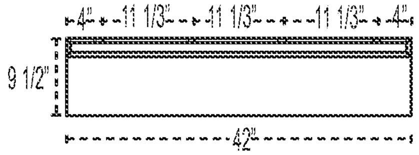
Figure 31C:
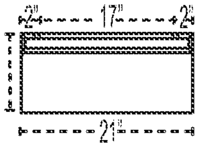
Figure 31D:
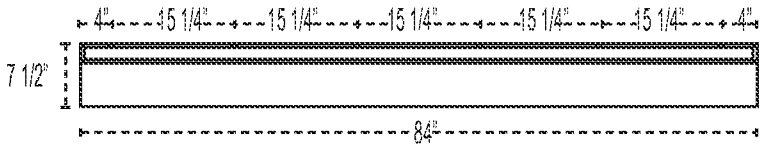
Figure 31E:
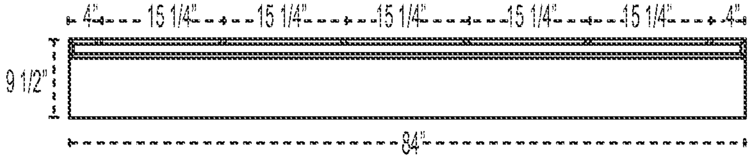
Figure 31F:
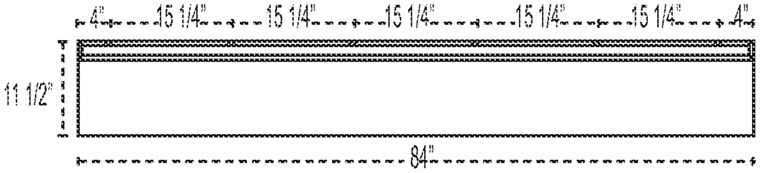

Similar to the description above, the dash ceiling baffle 10 design can be manufactured in various sizes and shapes to be configured for different size and shaped ceilings, to create the dash baffle image. FIGS. 31A through 31F show different standard lengths and standard depths for the various dash ceiling baffles 10. FIG. 31A for example shows an extra-large dash ceiling baffle 10 that is 84 inches long and 9.5 inches deep, while FIG. 31C shows a small dash ceiling baffle 10 that is 21 inches long and 9.5 inches deep. Additionally, FIG. 31D shows a dash ceiling baffle 10 that is 84 inches long and 7½ inches deep, while FIG. 31F shows a dash ceiling baffle 10 that is 84 inches long and 11½ inches deep. Of course, other size dash ceiling baffles 10 can be manufactured in keeping within the scope of the invention.

Figure 32:
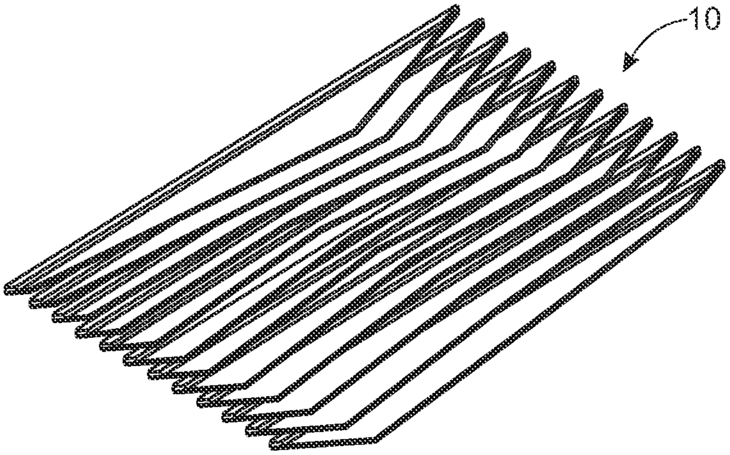
FIG. 32 is a top view of the ceiling baffles installed in the ceiling hanger in accordance with the present disclosure.

Similar to the preferred embodiment disclosed above, FIG. 32 shows a ridge ceiling baffle system 100 made up of six ridge ceiling baffles 10 that are each designed to a different shape and when attached in a particular order (for example, 1-2-3-4-5-6-6-5-4-3-2-1) they provide a ridge image on the ceiling. Each of the numbered ridge ceiling baffles 10, 6 through 1, is represented by FIGS. 33A through 33F, respectively.

Figure 33A:
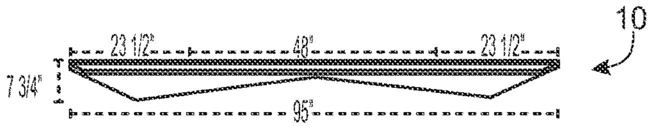
FIGS. 33A through 33K are front views of differently shaped ceiling baffles in accordance with the present disclosure.
Figure 33B:
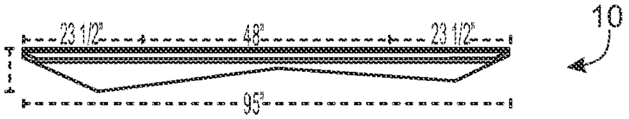
Figure 33C:
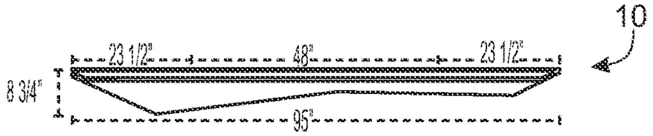
Figure 33D:
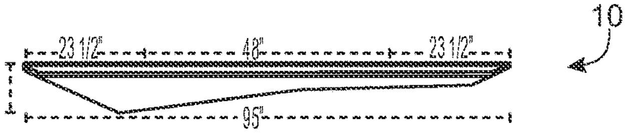
Figure 33E:
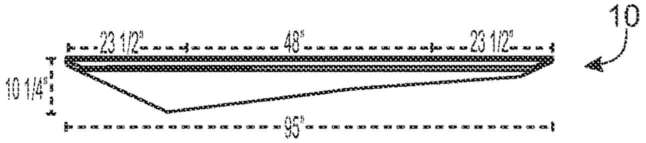
Figure 33F:
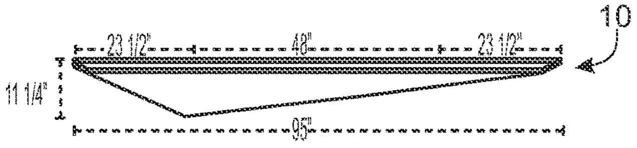

Accordingly. FIG. 32 includes FIG. 33A, which shows the front view of a ridge ceiling baffle 10 that is 95 inches long and 7 inches deep at its two deepest points and tapers off to a V near the center; FIG. 33B, which shows the front view of a ridge ceiling baffle 10 that is 95 inches long and 7.75 inches deep at its deepest end, with the other ridge having a smaller depth, and tapering off to a lesser degree in the middle; FIG. 33C, which shows the front view of a ridge ceiling baffle 10 that is 95 inches long and 8.75 inches deep and similarly tapers off to a center and a reduced depth near the other end; FIG. 33D, which shows the front view of a ridge ceiling baffle 10 that is 95 inches long and 9.5 inches deep and further tapering off at the other end; FIG. 33E, which shows the front view of a ridge ceiling baffle 10 that is 95 inches long and 10.25 inches deep and tapering off more at the other end; and FIG. 33F, which shows the front view of a ridge ceiling baffle 10 that is 95 inches long and 11.25 inches deep and tapering off completely at the other end. By alternating these differently sized ridge ceiling baffles 10, as shown in FIG. 32, the ceiling baffle system 100 will create a ridge effect. Of course, other sizes and combinations can be used for similar or different effect.

Figure 33G:
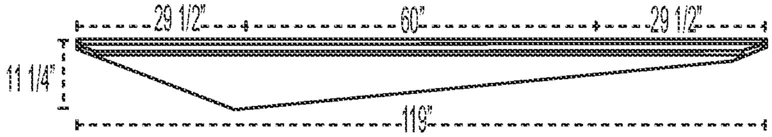
Figure 33H:
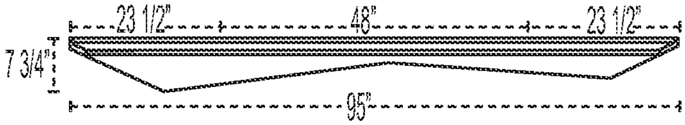
Figure 33I:
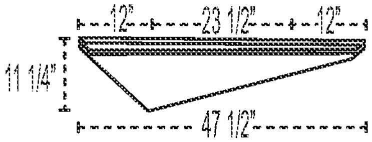
Figure 33J:
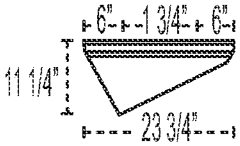
Figure 33K:
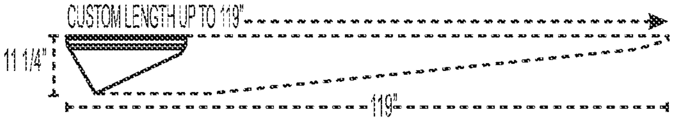

As disclosed above, the ridge ceiling baffle 10 design can be manufactured in various sizes and shapes to be configured for different size and shaped ceilings, to create the ridge baffle image. FIGS. 33G through 33K show different standard lengths and standard depths for the various ridge ceiling baffles 10. FIG. 33G for example shows an extra-large ridge ceiling baffle 10 that is 119 inches long and 11.25 inches at its deepest point, while FIG. 33J shows a small ridge ceiling baffle 10 that is 23.75 inches long and 11.25 inches at its deepest point. Additionally, FIG. 33K shows a custom ridge ceiling baffle 10 that is from 23.75 inches long to 119 inches long and 11.25 inches deep. Of course, other size ridge ceiling baffles 10 can be manufactured in keeping within the scope of the invention.

As understood by one having ordinary skill in the art, there are numerous shapes of ceiling hangers and exposed ceiling structure for which the present invention could mate to hold a ceiling baffle 10 in place. Each of these configurations and alternative embodiments can be used alone or together to provide an easy to use locking mechanism to hold a ceiling baffle 10 in place.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A ceiling baffle comprising:

a body portion comprising a top edge, a recess in the top edge that is defined by a floor, a first wall extending from the floor to the top edge, and a second wall extending from the floor to the top edge;

at least one locking mechanism protruding from the floor of the recess along a longitudinal axis, that at least one locking mechanism being spaced apart from the first wall by a first gap and from the second wall by a second gap, the at least one locking mechanism comprising a first engagement surface that faces the floor of the recess on a first side of the longitudinal axis and a second engagement surface that faces the floor of the recess on a second side of the longitudinal axis;

wherein the ceiling baffle is a monolithic component comprising the body portion and the at least one locking mechanism; and wherein the ceiling baffle is configured to be mounted to a ceiling hanger by engagement between the first and second engagement surfaces of the at least one locking mechanism and engagement surfaces of the ceiling hanger.

2. The ceiling baffle according to claim 1 wherein the monolithic component that comprises the body portion and the at least one locking mechanism are formed from a compressible material.

3. The ceiling baffle according to claim 1 wherein the body portion and the at least one locking mechanism are formed from a felt material.

4. The ceiling baffle according to claim 1 wherein the at least one locking mechanism comprises a base portion that protrudes from the floor of the recess and a top portion that extends from the base portion, the top portion comprising a first lower surface portion that protrudes from the base portion towards the first wall of the recess to form the first engagement surface and a second lower surface portion that protrudes from the base portion towards the second wall of the recess to form the second engagement surface.

5. The ceiling baffle according to claim 1 wherein the body portion of the ceiling baffle comprises a first major surface, a second major surface, a bottom edge, and the top edge, and wherein when the ceiling baffle is mounted to the ceiling hanger, the first and second major surfaces are oriented vertically and the bottom surface is oriented horizontally and faces downwardly.

6. A ceiling system comprising:

at least one ceiling hanger, each of the at least one ceiling hanger being elongated along a first axis and comprising:

a top wall and first and second sidewalls that collectively define a cavity having an open bottom end; and a first engagement feature located on a first side of the first axis and extending from the first sidewall into the cavity and a second engagement feature located on a second side of the first axis and extending from the second sidewall into the cavity;

at least one ceiling baffle comprising:

a top edge;

at least one recess comprising a floor that forms a lower boundary of the recess, a first wall that extends from the floor to the top edge, and a second wall that extends from the floor to the top edge; and a locking mechanism protruding from the floor of the recess towards the top edge along a second axis, the locking mechanism comprising a first engagement surface located on a first side of the second axis and a second engagement surface located on a second side of the second axis;

the at least one ceiling baffle configured to be coupled to the at least one ceiling hanger by inserting the locking mechanism of the at least one ceiling baffle through the open bottom end and into the cavity of the at least one ceiling hanger until the first and second engagement surfaces of the locking mechanism engage the first and second engagement features of the at least one ceiling hanger, the first wall of the recess faces an outer surface of the first sidewall of the at least one ceiling hanger, and the second wall of the recess faces an outer surface of the second sidewall of the at least one ceiling hanger.

7. The ceiling system according to claim 6 wherein the at least one ceiling baffle is moved in a direction perpendicular to the first axis to insert the locking mechanism into the cavity of the ceiling hanger.

8. The ceiling system according to claim 6 wherein the at least one locking mechanism is altered from an original shape to a compressed state as the at least one locking mechanism passes through the open bottom end of the cavity, the at least one locking mechanism returning to the original shape once fully seated within the cavity of the at least one hanger.

9. The ceiling system according to claim 6 wherein the at least one ceiling baffle and the locking mechanism are formed from a felt material.

10. The ceiling system according to claim 6, wherein the at least one locking mechanism comprises a base portion that is connected to the floor of the recess and a top portion that extends from the base portion towards the top edge of the ceiling baffle, the top portion comprising a first lower surface portion that protrudes from the base portion towards the first wall of the recess to form the first engagement surface and a second lower surface portion that protrudes from the base portion towards the second wall of the recess to form the second engagement surface, each of the first and second lower surface portions being spaced apart from the floor by a cut out.

11. The ceiling system according to claim 6 wherein the at least one locking mechanism is spaced apart from each of the first and second side walls of the recess.

12. A ceiling baffle comprising: a bottom end, a top end, a first side end extending from the bottom end to the top end, a second side end extending from the bottom end to the top end, and a baffle axis extending from the first side end to the second side end; a locking mechanism comprising a side profile when viewed from a viewing angle that is perpendicular to the baffle axis, the side profile comprising a first downwardly facing shoulder, a second downwardly facing shoulder, a first chamfered surface extending from the first downwardly facing shoulder towards a top end of the locking mechanism, and a second chamfered surface extending from the second downwardly facing shoulder towards the top end of the locking mechanism; wherein the first and second downwardly facing shoulders of the locking mechanism are configured to engage a ceiling hanger to mount the ceiling baffle to the ceiling hanger; a recess in the top edge, the recess being defined by a recess floor, a first wall that extends from the recess floor to the top edge, and a second wall that extends from the recess floor to the top edge; and wherein the locking mechanism protrudes from the recess floor and is spaced from each of the first and second walls of the recess.

13. The ceiling baffle according to claim 12 wherein each of the first and second downwardly facing shoulders is oriented parallel to the recess floor, the first downwardly facing shoulder being spaced from the recess floor by a first cut out and the second downwardly facing shoulder being spaced from the recess floor by a second cut out.

14. The ceiling baffle according to claim 12 further comprising a plurality of the locking mechanisms that are arranged in a spaced apart manner in a direction of the baffle axis.

15. The ceiling baffle according to claim 12 wherein the locking mechanism comprises a longitudinal axis that is perpendicular to the baffle axis, wherein the first downwardly facing shoulder is located on a first side of the longitudinal axis and the second downwardly facing shoulder is located on a second side of the longitudinal axis.

16. The ceiling baffle according to claim 12 wherein the ceiling baffle is a monolithic component formed from a compressible material.

17. The ceiling baffle according to claim 12 wherein the ceiling baffle is a monolithic component formed from a felt material.

18. The ceiling baffle according to claim 15 wherein the felt material is a PET felt.

19. A ceiling baffle comprising: a bottom end, a top end, a first side end extending from the bottom end to the top end, a second side end extending from the bottom end to the top end, and a baffle axis extending from the first side end to the second side end; a locking mechanism comprising a side profile when viewed from a viewing angle that is perpendicular to the baffle axis, the side profile comprising a first downwardly facing shoulder, a second downwardly facing shoulder, a first chamfered surface extending from the first downwardly facing shoulder towards a top end of the locking mechanism, and a second chamfered surface extending from the second downwardly facing shoulder towards the top end of the locking mechanism; wherein the first and second downwardly facing shoulders of the locking mechanism are configured to engage a ceiling hanger to mount the ceiling baffle to the ceiling hanger; a first surface and a second surface opposite the first surface, each of the first and second surfaces extending between the bottom end and the top end and between the first side end and the second side end; and wherein each of the first and second downwardly facing shoulders extend from the first surface of the ceiling baffle to the second surface of the ceiling baffle.

* * * * *